(12) United States Patent
Brinkhoff et al.

(10) Patent No.: US 11,734,032 B1
(45) Date of Patent: Aug. 22, 2023

(54) VIRTUAL DESKTOP SWITCHING AND COMMUNICATIONS

(71) Applicant: Microsoft Technology Licensing, LLC, Redmond, WA (US)

(72) Inventors: Christiaan Brinkhoff, Woodinville, WA (US); Sandeep Patnaik, Kirkland, WA (US); Jinhua Fei, Bellevue, WA (US); Prasanna Padmanabhan, Redmond, WA (US); Randall Cook, Washington, UT (US); Matthew Shadbolt, Melbourne (AU); Roland Radtke, Brier, WA (US); John Christopher Whytock, Portland, OR (US); Gary Liao, Bellevue, WA (US); Alexander Ryan Fromm, Woodinville, WA (US); Parthasarathy Sundararajan, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/744,637

(22) Filed: May 14, 2022

Related U.S. Application Data

(60) Provisional application No. 63/326,178, filed on Mar. 31, 2022.

(51) Int. Cl.
*G06F 3/0481* (2022.01)
*G06F 9/451* (2018.01)

(52) U.S. Cl.
CPC ............ *G06F 9/452* (2018.02); *G06F 3/0481* (2013.01)

(58) Field of Classification Search
CPC . G06F 9/452; G06F 9/455; G06F 9/48; G06F 3/0481; G06F 3/0482; G06F 3/04842
See application file for complete search history.

(56) References Cited

U.S. PATENT DOCUMENTS

| 8,028,040 B1 | 9/2011 | Hobbs et al. |
| 9,436,361 B2 | 9/2016 | Mir et al. |
| 11,099,865 B2 | 8/2021 | Ma et al. |

(Continued)

OTHER PUBLICATIONS

Sashank Sridhar et al., Cross-Platform Remote Desktop Sharing with IP Tunneling, Jul. 1, 2020, IEEE Xplore, pp. 1-7 (Year: 2020).*

(Continued)

*Primary Examiner* — Tam T Tran
(74) *Attorney, Agent, or Firm* — Ogilvie Law Firm

(57) ABSTRACT

A desktop switcher provides equally convenient user interface navigational access to remote virtual desktops as to local virtual desktops for reliable and convenient human-computer interaction. Underlying mechanisms transparently confirm remote computer availability and compatibility, transfer thumbnails between computers, and support remoting sessions. Virtual desktops may share a clipboard, a geographic location setting, and application thumbnails, despite being based on computers that are remote from one another, e.g., when only one of a session's computers resides in a cloud. Virtual desktop context menus may be shown and utilized remotely. A visual separator in the desktop switcher may distinguish local virtual desktops from remote virtual desktops.

20 Claims, 8 Drawing Sheets

(56) References Cited

U.S. PATENT DOCUMENTS

| | | | |
|---|---|---|---|
| 2003/0189597 A1* | 10/2003 | Anderson | G06F 3/0481 |
| | | | 715/778 |
| 2004/0255270 A1* | 12/2004 | McGlinchey | G06F 9/453 |
| | | | 717/109 |
| 2005/0204026 A1* | 9/2005 | Hoerl | H04L 41/04 |
| | | | 709/250 |
| 2006/0085760 A1 | 4/2006 | Anderson et al. | |
| 2007/0076230 A1* | 4/2007 | Li | G06F 3/1454 |
| | | | 358/1.15 |
| 2008/0270910 A1 | 10/2008 | Lukasik et al. | |
| 2009/0235177 A1 | 9/2009 | Saul et al. | |
| 2010/0269060 A1 | 10/2010 | Bandholz et al. | |
| 2012/0096392 A1* | 4/2012 | Ording | G06F 9/451 |
| | | | 715/783 |
| 2016/0077685 A1 | 3/2016 | Fang et al. | |
| 2016/0085388 A1 | 3/2016 | Fang et al. | |
| 2019/0132381 A1 | 5/2019 | Momchilov et al. | |
| 2019/0303816 A1* | 10/2019 | Moore | G06F 9/452 |
| 2021/0342042 A1 | 11/2021 | Singh et al. | |
| 2021/0342049 A1 | 11/2021 | Singh et al. | |
| 2022/0269378 A1* | 8/2022 | Joseph | G06F 9/452 |

OTHER PUBLICATIONS

Antonio Celesti et al., Improving Desktop as a Service in OpenStack, Jun. 1, 2016, IEEE Xplore, pp. 1-8 (Year: 2016).*

"Thomas Berger's Post", retrieved from <<https://www.linkedin.com/posts/thomasbergerpublic_citrix-android-daas-activity-6950463465643757568-dyg0?utm_source=linkedin_share&utm_medium=ios_app>>, retrieved Jul. 25, 2022, 9 pages.

"Citrix Workspace app for Android", retrieved from <<https://docs.citrix.com/en-us/citrix-workspace-app-for-android/whats-new.html#2260>>, Jul. 25, 2022, 10 pages.

"Lifecycle Milestones for Citrix Workspace app and Citrix Receiver", retrieved from <<https://www.citrix.com/support/product-lifecycle/workspace-app.html>>, Jun. 16, 2022, 3 pages.

Cong, Duc, "Download free vpn", Retrieved from: https://xmccomplex.com.vn/radmin-server/, Jan. 21, 2022, 6 Pages.

"Desktop virtualization", retrieved from <<https://en.wikipedia.org/wiki/Desktop_virtualization>>, Apr. 8, 2022, 5 pages.

"Desktop environment", retrieved from <<https://en.wikipedia.org/wiki/Desktop_environment>>, Mar. 28, 2022, 9 pages.

"Desktop metaphor", retrieved from <<https://en.wikipedia.org/wiki/Desktop_metaphor>>, Jan. 27, 2022, 4 pages.

Griffon, "RDS—RDCMan Remote connection Tool Discontinued by Microsoft", retrieved from <<https://c-nergy.be/blog/?p=14521>>, Mar. 22, 2020, 7 pages.

Jenny Knafo, "[New Feature] Live Thumbnail", retrieved from <<https://blog.devolutions.net/2019/06/new-feature-live-thumbnail/>>, Jun. 20, 2019, 5 pages.

"Task View", retrieved from <<https://en.wikipedia.org/wiki/Task_View>>, Jan. 3, 2022, 2 pages.

"Virtual desktop", retrieved from <<https://en.wikipedia.org/wiki/Virtual_desktop>>, Feb. 22, 2022, 6 pages.

"Microsoft Windows", retrieved from <<https://en.wikipedia.org/wiki/Microsoft_Windows>>, Mar. 11, 2022, 27 pages.

"Welcome to your Windows 365 Cloud PC", retrieved from <<https://www.microsoft.com/en-us/windows-365>>, no later than Mar. 24, 2022, 5 pages.

"Dynamic Virtual Channels", retrieved from <<https://docs.microsoft.com/en-us/windows/win32/termserv/dynamic-virtual-channels>>, Aug. 23, 2019, 2 pages.

"Remote Desktop Protocol", retrieved from <<https://en.wikipedia.org/wiki/Remote_Desktop_Protocol>>, Feb. 24, 2022, 13 pages.

"Get started with the Windows Desktop client", retrieved from <<https://docs.microsoft.com/en-us/windows-server/remote/remote-desktop-services/clients/windowsdesktop>>, Dec. 23, 2021, 8 pages.

"Secure Shell", retrieved from <<https://en.wikipedia.org/wiki/Secure_Shell>>, Mar. 24, 2022, 12 pages.

"Apple Remote Desktop User Guide", retrieved from <<https://support.apple.com/guide/remote-desktop/welcome/mac>>, no later than Mar. 24, 2022, 2 pages.

Rahul Saigal, "The 3 Best Mac App Switchers for Jumping Between Apps and Windows", retrieved from <<https://vww.makeuseof.com/tag/mac-app-switchers/>>, Jul. 16, 2018, 20 pages.

"International Search Report and Written Opinion Issued in PCT Application No. PCT/US23/010850", dated Apr. 24, 2023, 15 Pages.

* cited by examiner

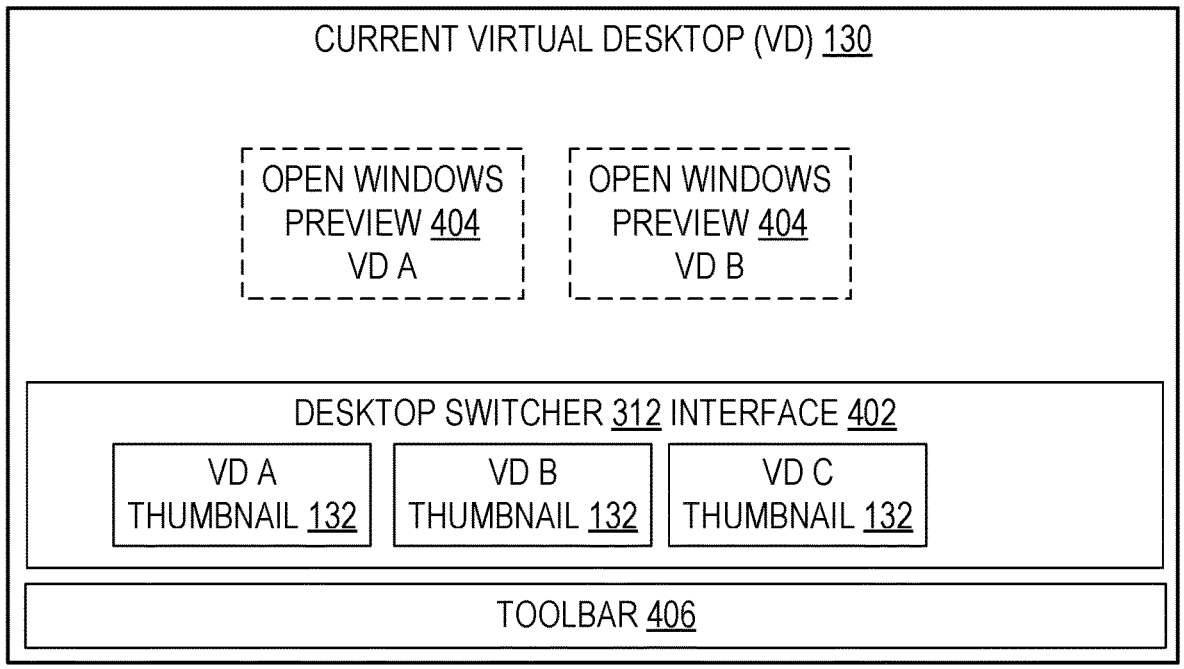
Fig. 4
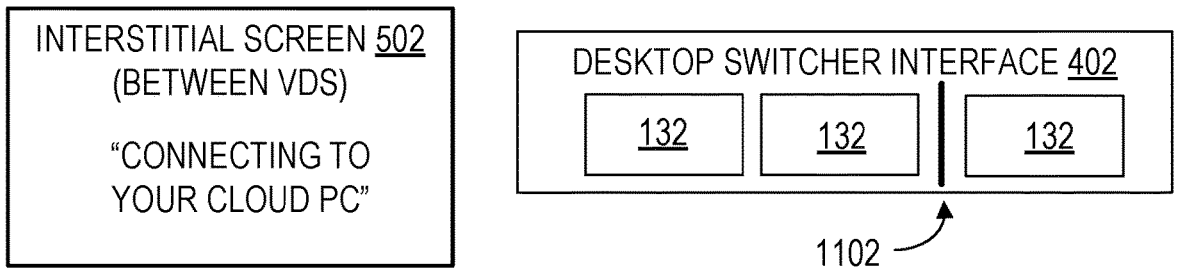
Fig. 5
Fig. 11
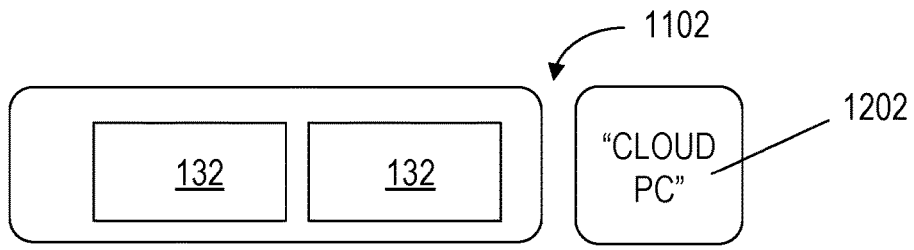
Fig. 12

VIRTUAL DESKTOP SWITCHING AND COMMUNICATIONS

RELATED APPLICATION

The present application is a non-provisional of, claims priority to, and incorporates by reference the entirety of, U.S. provisional patent application No. 63/326,178 filed 31 Mar. 2022.

BACKGROUND

Computer networking allows two or more computers to communicate with each other over a distance. Computers may be located in different rooms of a building, in different buildings on a campus, in different cities, or even in different countries, but still exchange digital information over one or more network communication paths. Network communications support email, website browsing, software-as-a-service, mobile phone usage, video streaming, and other services.

SUMMARY

The present disclosure describes tools and techniques for switching between virtual desktops for human-computer interaction driven by a user at a local machine, for communicating between virtual desktops, and other teachings. Some of the described embodiments provide equal user interface navigational access to local desktops and remote desktops during human-computer interaction. Some embodiments share particular data or functionalities between virtual desktops, such as a clipboard, a context menu, application thumbnails, or a geographic location setting.

In some embodiments, a desktop switcher is configured for switching between virtual desktops as opposed to switching between tasks within a single virtual desktop. In some, virtual desktop access management operations display a remote computer desktop thumbnail and a local computer desktop thumbnail in a desktop switcher on a local computer. The local computer desktop thumbnail operationally represents a local computer virtual desktop of the local computer, and the remote computer desktop thumbnail operationally represents a remote computer virtual desktop of a remote computer which is physically remote from the local computer.

In some of these examples, each thumbnail is displayed in the desktop switcher at the same navigational depth with respect to tool invocations. In some, the thumbnails are leaves of a navigation path that branches initially at the desktop switcher.

After obtaining, via the desktop switcher, a user selection of the remote computer desktop thumbnail, an embodiment may set a current user interface desktop focus on the local computer to be the remote computer virtual desktop, and may communicate with the remote computer in response to human-computer interaction at the local computer. In this way, the local computer allows a user who is physically located at the local computer to operate the remote computer using the remote computer's virtual desktop. This may be accomplished without using any separate tool such as an application which is both (a) designed for selection of a remote computer virtual desktop and (b) not used for selection of a local computer virtual desktop.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a simplified user interface diagram illustrating aspects of virtual desktop utilization;

FIG. 5 is a diagram representing a user interface interstitial screen;

FIG. 11 is a simplified user interface diagram illustrating a vertical bar as a visual separator in a desktop switcher user interface;

FIG. 12 is a simplified user interface diagram illustrating a gap as a visual separator in a desktop switcher user interface;

DETAILED DESCRIPTION

Overview

Figure 1:
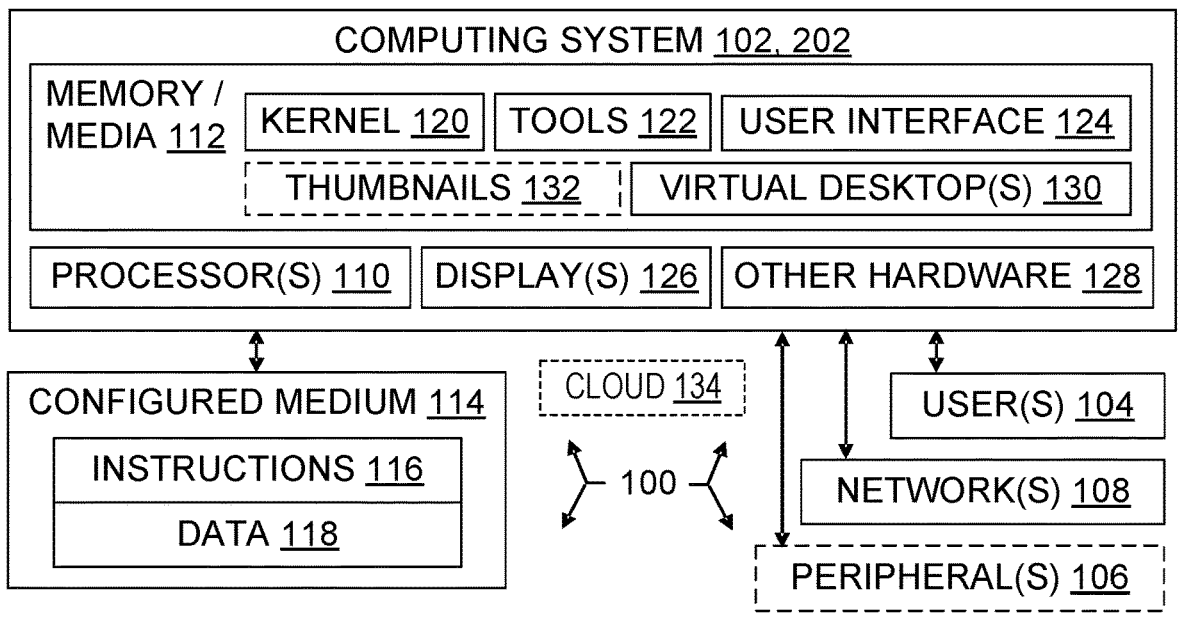
FIG. 1 is a block diagram illustrating aspects of computer systems and also illustrating configured storage media.

Innovations may expand beyond their origins, but understanding an innovation's origins can help one more fully appreciate the innovation. In the present case, some teachings described herein were motivated by technical challenges arising from ongoing efforts to help Microsoft customers utilize cloud-based resources.

In particular, Microsoft innovators explored ways to help users switch easily between a local PC (personal computer) and a cloud-based PC. This effort faced several technical challenges. One challenge is how to represent a cloud-based PC in a user interface on a local PC. For example, SSH (secure shell) represents remote computers using an IP address or domain name, and possibly also using a port number specified by a user.

Another challenge is how to present the available cloud-based PCs in the user interface on a local PC so the user can make a selection between them.

SSH presumes the user already knows what IP addresses, for example, represent available remote computers.

A third challenge is to determine which kinds of data are communicated between local and remote computers, and how communicated data is used at its destination. For example, SSH transfers textual command lines, which are designed to be executed by a command line interpreter at their destination.

Other challenges will also become apparent to one of skill in the art as the present disclosure is studied.

The innovators recognized that one potential approach to communicating with a cloud-based PC from a local PC is to open a command line interface window on the local PC, and then use SSH or a similar protocol to establish a connection with a shell on the cloud-based PC. But this approach has the disadvantage that the user is called on to specify low-level information such as an IP address, port number, and encryption configuration, as well as having the disadvantage that the resulting communications are primarily or solely for textual data or file transfer. With the benefit of teachings provided herein, it will also be apparent that a disadvantage of this SSH-centered approach is that the communications travel from one shell command line interpreter to another shell command line interpreter, which inhibits, prevents, or makes difficult certain kinds of desirable sharing at a virtual desktop level, e.g., sharing a virtual desktop clipboard, a virtual desktop context menu, application thumbnails, or a geographic setting for a virtual desktop.

Another potential approach is to launch a remote sessions management tool on the local PC, and use that tool to open a remoting session with the cloud-based PC. But this approach may have the disadvantage that different sessions reside in different respective windows. Moreover, users may be called on to provide low-level session management when sessions are manually and tediously disconnected, initialized, connected, or reconnected by a user in order to start a session, resume a session, or switch between sessions. With the benefit of teachings provided herein, it also is apparent that this sessions tool approach has the same disadvantage noted above, namely, that communications travel from one shell command line interpreter to another shell command line interpreter as opposed to traveling between virtual desktops.

By contrast, some embodiments taught herein place virtual desktop thumbnails in a desktop switcher and provide underlying session management and shell-virtual-desktop coordination mechanisms. One result is to make the virtual desktops which are represented by the thumbnails easily selectable, without imposing any requirement for users to understand SSH or to launch a separate remote sessions management tool for interaction within a window of a virtual desktop. Local and remote (e.g., cloud-based PC) virtual desktops may be treated as equals, so far as ease of navigation is concerned.

In addition, when thumbnails are displayed in the desktop switcher at the same navigational depth with respect to tool invocations, computational resources that would have been consumed by using a separate remoting sessions management application are conserved. Because the separate remoting sessions management application is not utilized, the enhanced system avoids consumption of processing cycles, memory, desktop real estate, GUI processing, and other computational resources required by launching and running remoting sessions management outside the desktop switcher and shell integration as taught herein.

Moreover, when the underlying communications are tailored toward virtual desktops connected via shells and remoting sessions as taught herein, instead of being tailored toward individual shell-to-shell sessions per se, some readily usable desktop functionalities may be provided via sharing at a virtual desktop level. For instance, an embodiment may support sharing a clipboard, a context menu, application thumbnails, or a geographic setting value for a virtual desktop that is independent of a physical location of a machine represented by the virtual desktop. These and other advantages will become apparent to one of skill in the art who is informed by the teachings herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 134. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities may be provided by a system 102. A screen 126 may be a removable peripheral 106 or may be an integral part of the system 102. The user interface 124 may support interaction between an embodiment and one or more human users. The user interface 124 may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of human user 104. Automated agents, scripts, playback software, devices, and the like running or otherwise serving on behalf of one or more humans may also have accounts, e.g., service accounts. Sometimes an account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a cloud 134 and/or other network 108 via network interface equipment, for example.

Each computer system 102 includes at least one processor 110. The computer system 102, like other suitable systems, also includes one or more computer-readable storage media 112, also referred to as computer-readable storage devices 112. Tools 122 may include software apps on mobile devices 102 or workstations 102 or servers 102, as well as APIs, browsers, or webpages and the corresponding software for protocols such as HTTPS, for example.

Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs, GPUs, and/or quantum processors), memory/storage media 112, peripherals 106, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, virtual desktop utilization functionality 204 could be installed on an air gapped network and then be updated periodically or on occasion using removable media 114. A given embodiment may also communicate technical data and/or technical instructions through direct memory access, removable or non-removable volatile or nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

Figure 2:
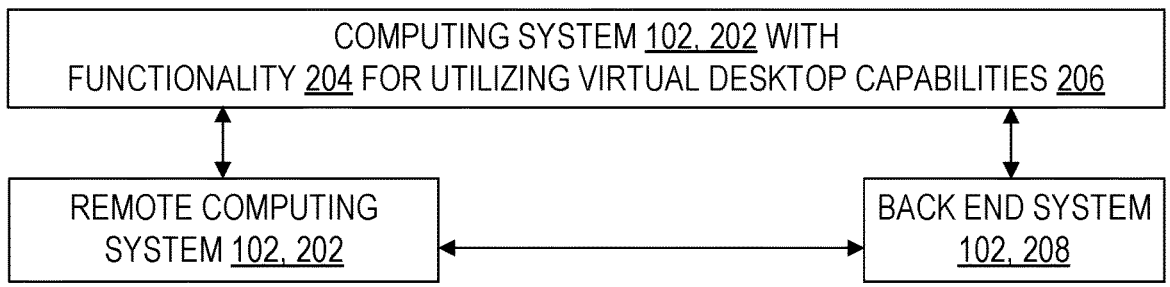
FIG. 2 is a block diagram illustrating aspects of a computing system which has one or more of the virtual desktop utilization enhancements taught herein.

FIG. 2 illustrates a computing system 102 configured by one or more of the virtual desktop utilization enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
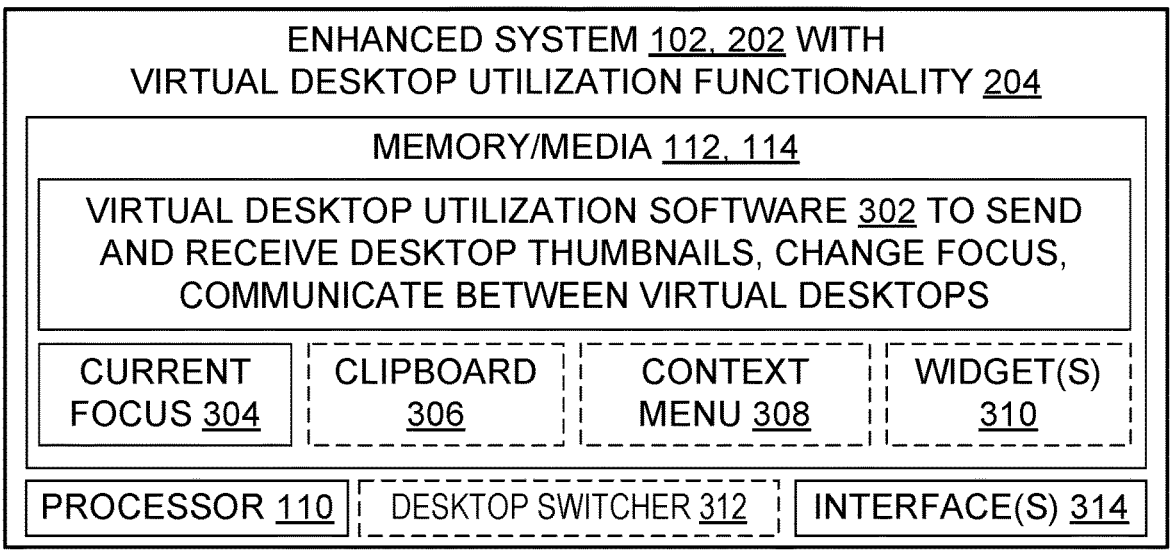
FIG. 3 is a block diagram illustrating an enhanced system configured with virtual desktop utilization functionality.

FIG. 3 illustrates an enhanced system 202 which is configured with virtual desktop utilization software 302 to help provide functionality 204. Software 302 and other FIG. 3 items are discussed at various points herein, and additional details regarding them are provided in the discussion of a List of Reference Numerals later in this disclosure document.

FIG. 4 shows aspects of user interface displaying a virtual desktop 130 with a desktop switcher user interface 402 displaying thumbnails 132 of three respective virtual desktops 130, previews 404 of windows that are open on respective virtual desktops A and B, and a tool bar 406. This is not a comprehensive summary of all virtual desktops 130, or a comprehensive summary of all user interface or virtual desktop mechanisms for potential use in or with a system 102.

FIG. 5 shows aspects of user interface displaying an interstitial screen 502 during a transition from having the current focus on one virtual desktop 130 to having the current focus on another virtual desktop 130. This is not a comprehensive summary of all interstitial screens, or a comprehensive summary of all focus transition mechanisms for potential use in or with a system 102. In some embodiments, whichever VD (local or remote) 130 has the current focus is displayed as a full screen desktop; VD stands for Virtual Desktop. The former VD will be minimized, e.g., the former VD's thumbnail will be visible only if the desktop switcher display is opened (e.g., as in FIG. 4), or the former VD will be represented as an icon in a taskbar 406 or on the current desktop.

Figure 6:
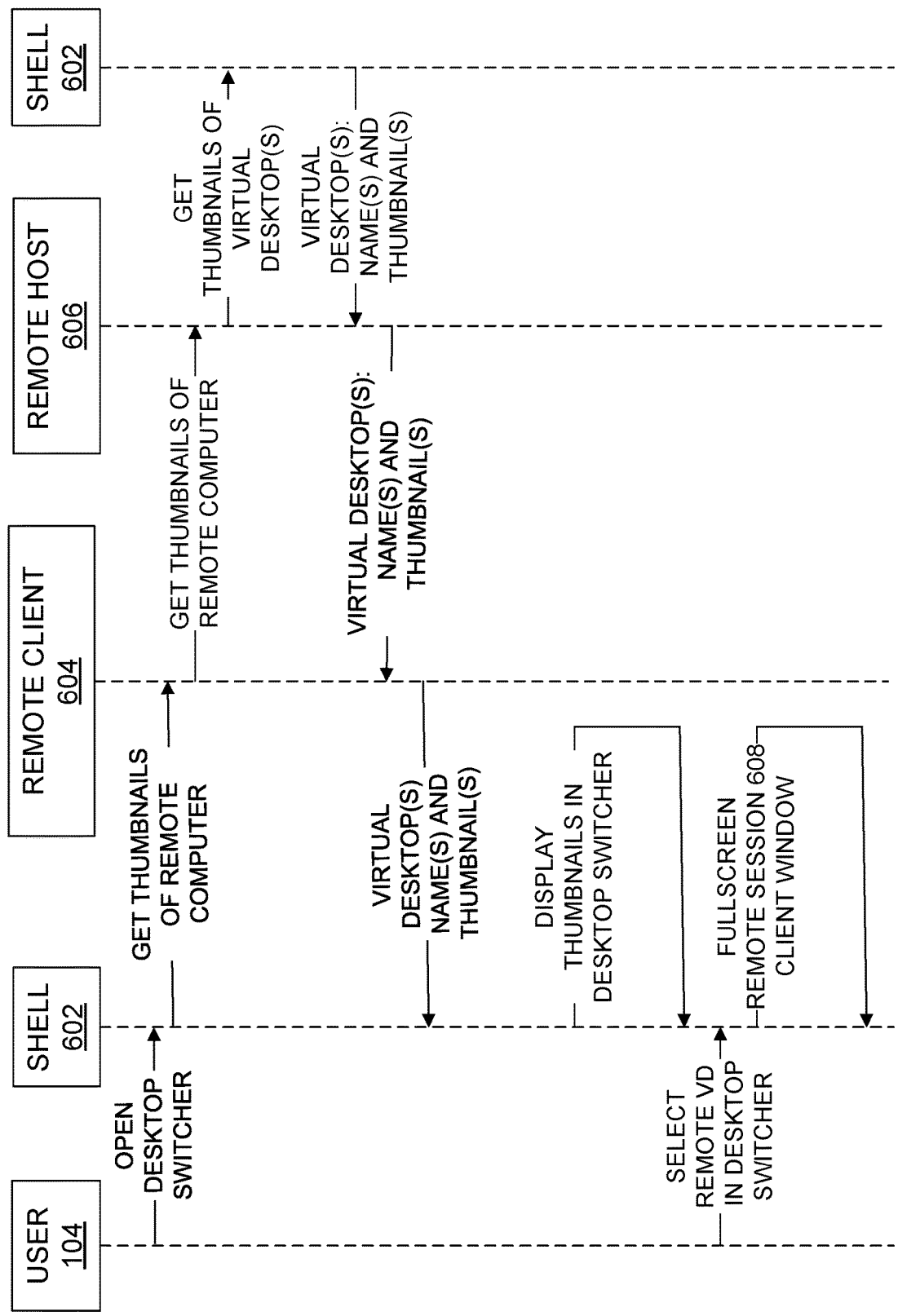
FIG. 6 is a data flow diagram illustrating aspects of virtual desktop utilization operation on a local computer.
Figure 7:
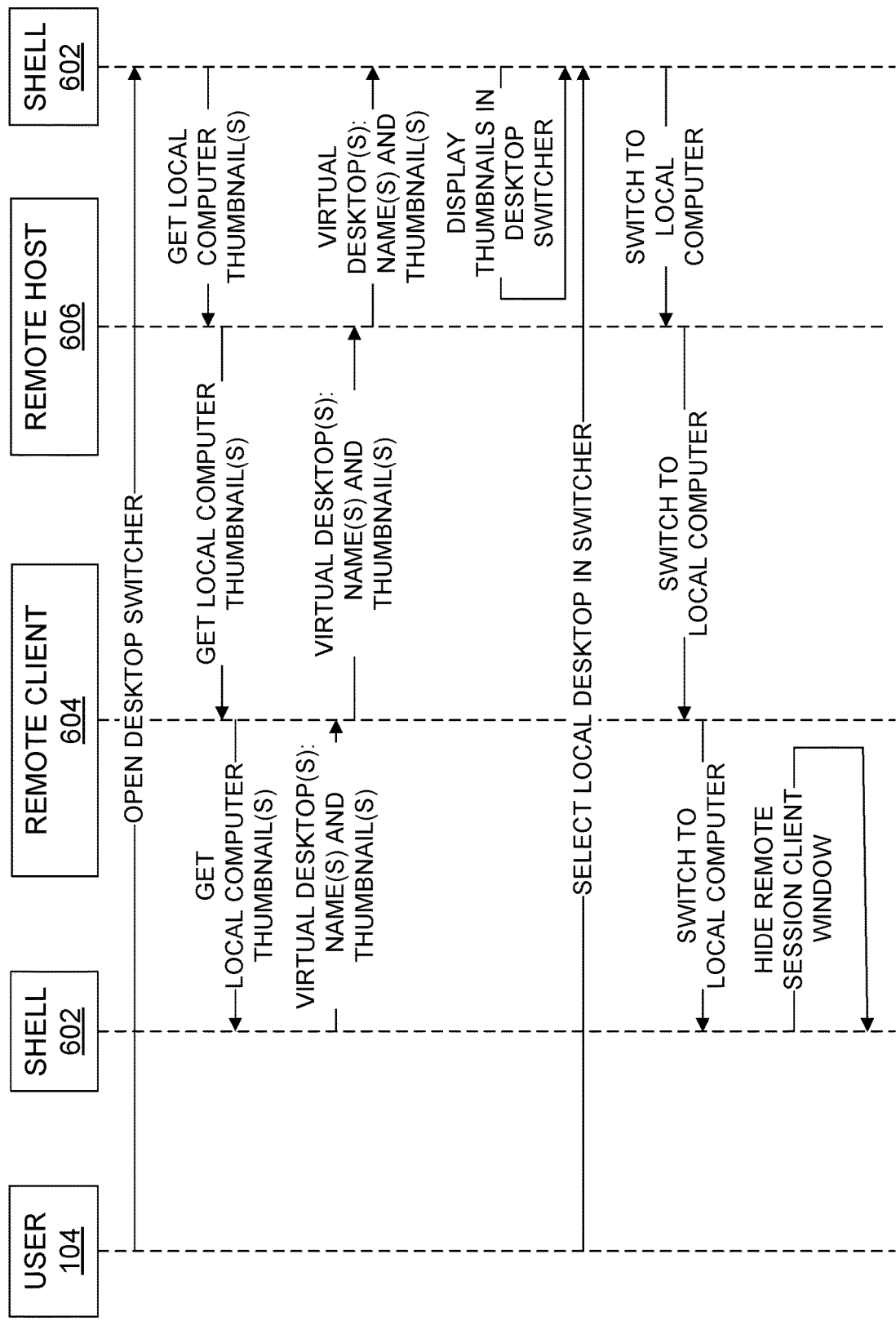
FIG. 7 is a data flow diagram illustrating aspects of virtual desktop utilization operation on a remote computer.

FIGS. 6 and 7 show data flows for switching between virtual desktops for interaction with a user at a local machine, and for communicating between virtual desktops. FIG. 6 illustrates computational operations when the current user interface focus is on a virtual desktop of a machine that is physically local to a given user, and FIG. 7 illustrates computational operations when the focus is a virtual desktop of a machine that is physically remote from the user. These Figures do not collectively or individually comprehensively summarize all data flows for switching between virtual desktops or all data flows for communicating between virtual desktops, or both.

Figure 8:
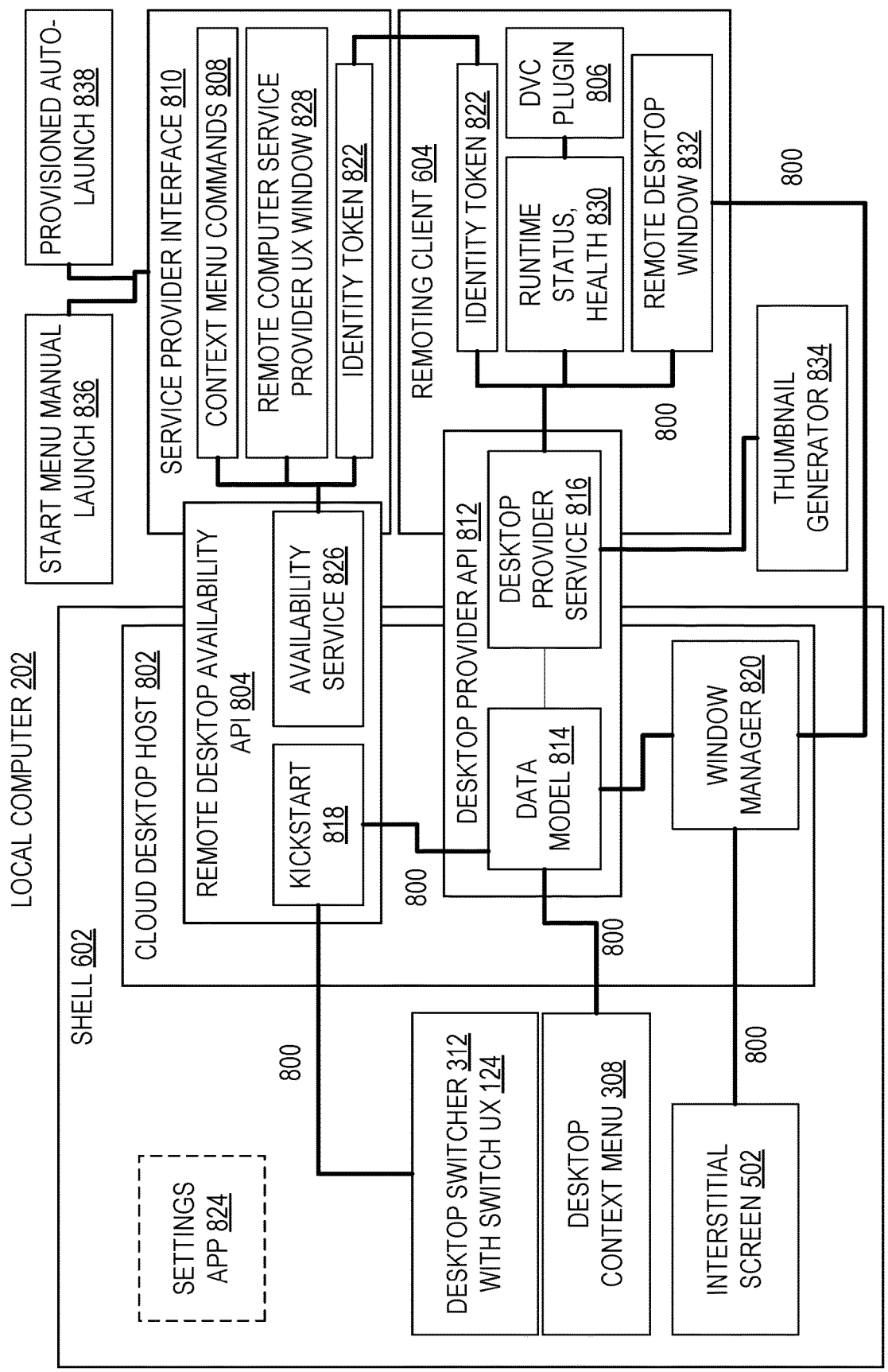
FIG. 8 is an architecture diagram illustrating virtual desktop utilization components and data connections on a local computer.
Figure 9:
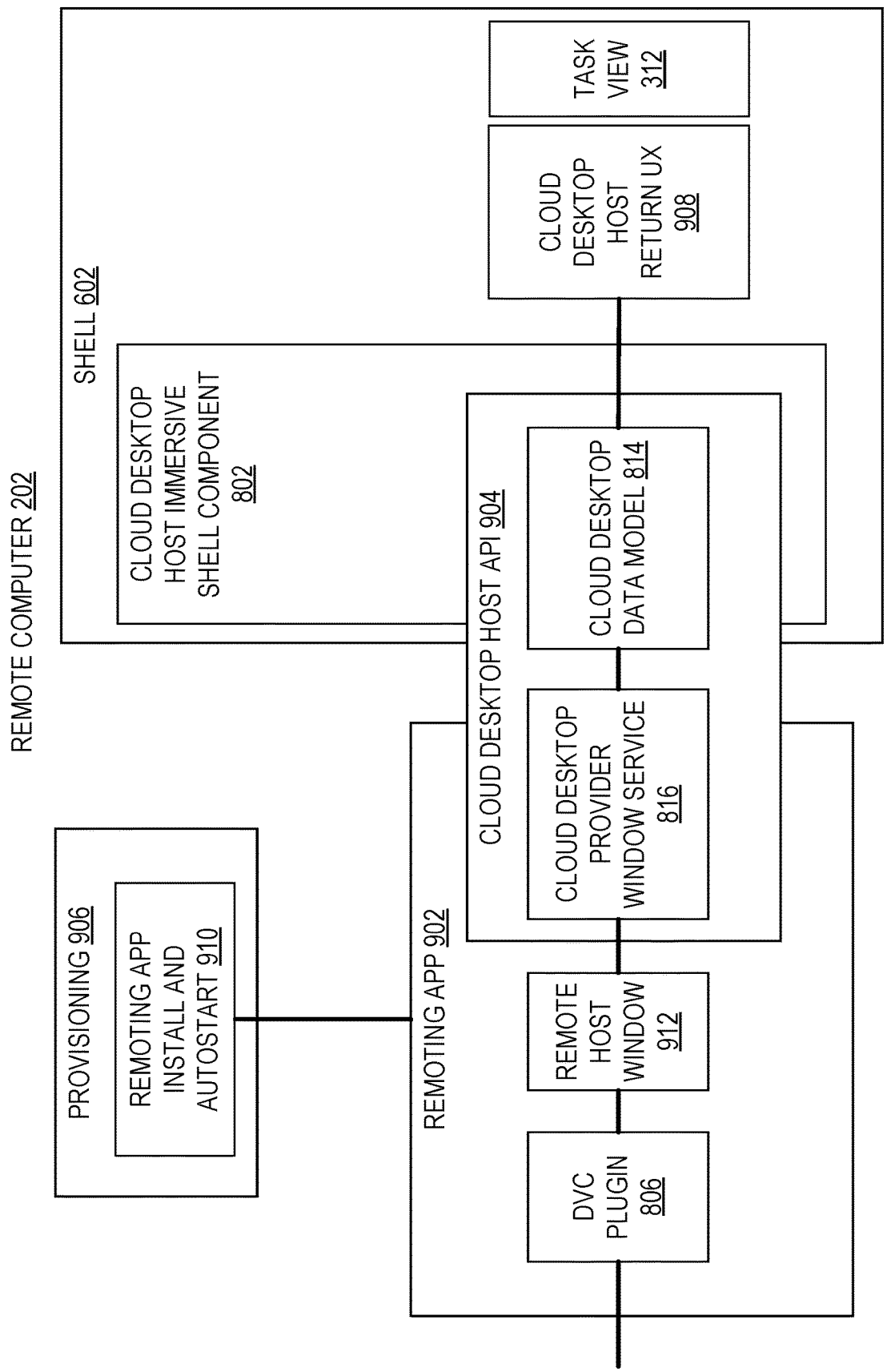
FIG. 9 is an architecture diagram illustrating virtual desktop utilization components and data connections on a remote computer.

FIGS. 8 and 9 show architectural components in an example architecture configured for switching between virtual desktops for interaction with a user at a local machine, and for communicating between virtual desktops. FIG. 8 illustrates components of a machine 202 that is physically local to a given user 104, and FIG. 9 illustrates components of a machine 202 that is physically remote from the user. These Figures do not collectively or individually comprehensively summarize all components for switching between virtual desktops or all data flows for communicating between virtual desktops, or both. In particular, aspects of these examples are specific to some Microsoft Windows® environments, but components tailored to other environments may be used instead or in addition, in other embodiments. Data flow directions are not explicitly indicated as arrows but one of skill informed by the teachings herein will be understood permissible or expected directions of data flow, which is also presumed bidirectional along the connections indicated by lines between components.

In some embodiments, a local computer 202 is configured to provide 1338 equal user interface navigational access 1340 to local desktops and remote desktops during human-computer interaction. In this example, the local computer includes: a digital memory 112; a display 126; a desktop switcher 312 residing in the digital memory, the desktop switcher configured for switching between virtual desktops as opposed to switching between tasks within a single virtual desktop; and a processor 110 in operable communication with the digital memory and the display. The processor is configured to perform virtual desktop access management including: displaying 1006 a remote computer desktop thumbnail 132 and a local computer desktop thumbnail 132 in the desktop switcher on the local computer, the local computer desktop thumbnail operationally representing 1302 a local computer virtual desktop of the local computer, the remote computer desktop thumbnail operationally representing 1302 a remote computer virtual desktop of a remote computer which is physically remote from the local computer, each thumbnail displayed 1006 in the desktop switcher at the same navigational depth 1402 with respect to tool invocations, obtaining 1008 via the desktop switcher a user selection 1328 of the remote computer desktop thumbnail, setting 1010 a current user interface desktop focus 304 on the local computer to be the remote computer virtual desktop, and communicating 1342 with the remote computer in response to human-computer interaction at the local computer. Accordingly, the local computer allows a user 104 who is physically located at the local computer to operate 1310 the remote computer using the remote computer's virtual desktop, without 1324 using any separate tool which is both designed for selection of a remote computer virtual desktop and not used for selection of a local computer virtual desktop.

Some embodiments include a local computer as describe in the preceding paragraph, in operable combination with the remote computer. In some embodiments, including some that include both the local computer 202 and the remote computer 202, the remote computer resides 1304 in a cloud 134. Some of these embodiments include a clipboard 306 which is configured to be shared 1012 using network communication 1342 between the remote computer virtual desktop and the local computer virtual desktop.

In some embodiments, the processor 110 is configured to display 1308 a visual separator 1102, in the desktop switcher, between the local computer desktop thumbnail 132 and the remote computer desktop thumbnail 132.

In some embodiments, a local computing system 202 includes: memory 112 (e.g., RAM, disk, etc.); a processor 110 configured to execute instructions; a shell 602 with a local virtual desktop (e.g., Microsoft Explorer® software, or functionally similar component(s)); a remoting client 604 (e.g., MSRDC, or functionally similar component(s)); a desktop switcher 312 (e.g., TaskView, or functionally similar component(s)); and one or more components for communication between the shell and the remoting client (e.g., Cloud Desktop Host, Cloud Desktop Provider API, or functionally similar component(s)). In some embodiments, the local computing system 202 performs a method according to FIG. 6. In some embodiments, the local computing system 202 performs a method according to FIG. 10.

In some embodiments, a remote computing system 202 includes: a memory 112 (e.g., RAM, disk, etc., in a cloud); a processor 110 configured to execute instructions; a shell 602 with a remote virtual desktop (e.g., Microsoft Explorer® software, or functionally similar component(s)); a remoting host 902 (e.g., RDP App, or functionally similar component(s)); a desktop switcher 312 (e.g., TaskView™ software, or functionally similar component(s), mark of Microsoft Corporation); and one or more components for communication between the shell and the remoting host (e.g., Cloud Desktop Host API 904, or functionally similar component(s)). In some embodiments, the remote computing system 202 performs a method according to FIG. 7. In some embodiments, the remote computing system 202 performs a method which is a remote operation mirror of FIG. 10 local operations, e.g., receiving and sending are mirror operations.

In some embodiments, the desktop switcher 312 is launched 1326 from, and communicates with, a widget 310 rather than a shell 602. In the example architecture figures, this corresponds to replacing the explorer.exe or other shell by a widget.exe, or by interposing a widget between the shell and the rest of the remoting communications path.

In some embodiments, if a user logs off the local computer, the shell 602 automatically and proactively notifies 1334 the remote computer via the remoting path, and the remote shell logs 1336 the user off the remote computer.

The examples herein are illustrative, not comprehensive. One of skill informed by the teachings herein will recognize that many other variations are also consistent with the teachings. In particular, different embodiments or configurations may vary as to the particular remoting protocol, desktop switcher, context menu items, operating system(s), number of virtual desktops, launch point for switching between virtual desktops, mechanism for discovering virtual desktops and their compatibility and availability characteristics, display layouts, interstitial screen content, use of animation for transitions, groupings of architectural components, inclusion or omission of architectural components not relied expressly upon, or shell(s), for example, and yet still be within the scope of the teachings presented in this disclosure.

Other system embodiments are also described herein, either directly or derivable as system versions of described processes or configured media, duly informed by the extensive discussion herein of computing hardware.

Although specific virtual desktop utilization architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of data, for example, as well as different technical features, aspects, version controls, security controls, mechanisms, rules, criteria, expressions, hierarchies, operational sequences, data structures, environment or system characteristics, or other virtual desktop utilization functionality 204 teachings noted herein, and may otherwise depart from the particular illustrative examples provided.

Processes (a.k.a. Methods)

Figure 10:
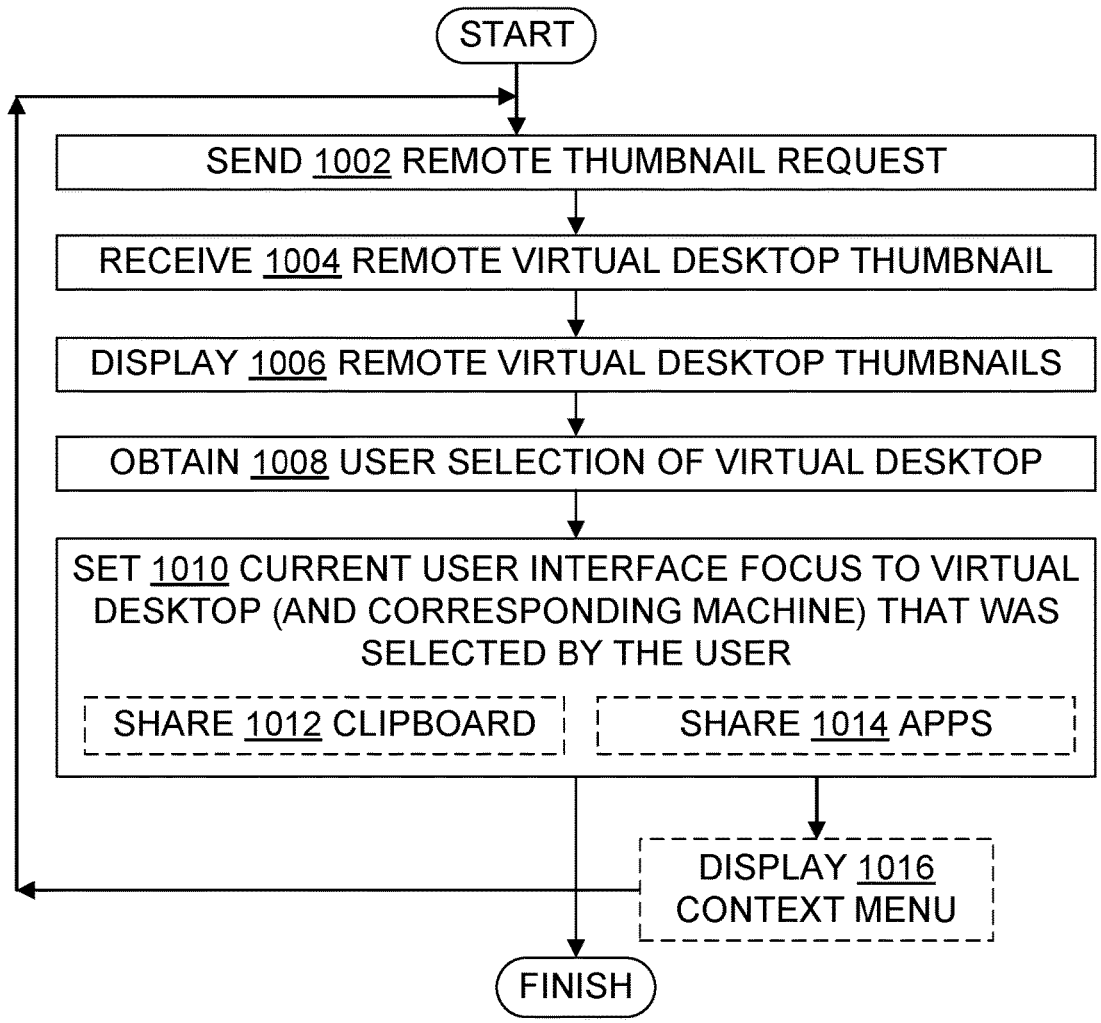
FIG. 10 is a flowchart illustrating steps in some virtual desktop utilization methods.
Figure 14:
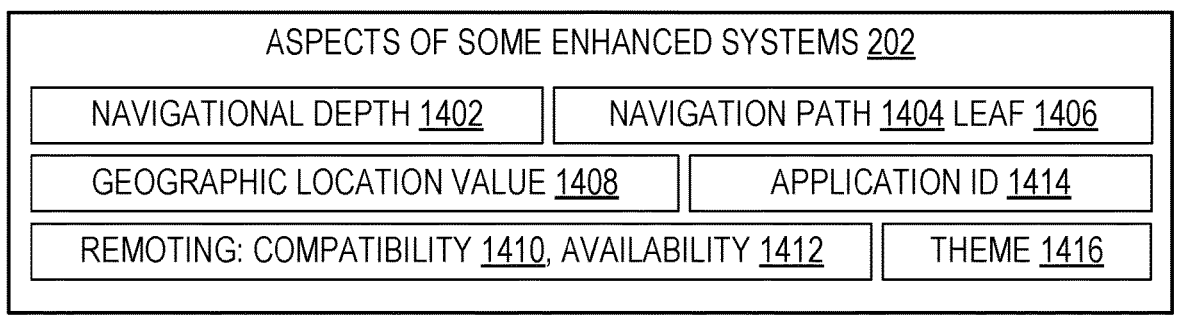
FIG. 14 is a block diagram illustrating some additional aspects of some virtual desktop utilization systems.

Methods (which may also be referred to as "processes" in the legal sense of that word) are illustrated in various ways herein, both in text and in drawing figures. FIGS. 6, 7, and 10 collectively and individually illustrate families of methods 600, 700, 1000 that may be performed or assisted by an enhanced system, such as system 202 or another functionality 204 enhanced system as taught herein. FIGS. 9 and 10 also help illustrate methods, in that the connections between components shown in these architecture drawings may carry data, and hence methods of carrying data between components are implicitly illustrated.

Technical processes shown in the Figures or otherwise disclosed will be performed automatically, e.g., by an enhanced system 202, unless otherwise indicated. Related processes may also be performed in part automatically and in part manually to the extent action by a human person is implicated, e.g., in some embodiments a human 104 may click a button to indicate selection 1328 of a particular thumbnail 132 which digitally represents a virtual desktop 130 (and hence represents a system 102 running that virtual desktop 130). But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 10. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 1000 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

In some embodiments, a method of operation by a local computer for navigational access 1340 to local desktops and remote desktops during human-computer interaction includes: sending 1002, to a remote computer which is physically remote from the local computer, a remote computer desktop thumbnail request; receiving 1004 a remote computer desktop thumbnail which visually represents 1302 a remote computer virtual desktop of the remote computer; displaying 1006 the remote computer desktop thumbnail in a desktop switcher 312 on the local computer, together with a local computer desktop thumbnail which represents 1302 a local computer virtual desktop of the local computer, the remote computer desktop thumbnail and the local computer desktop thumbnail each displayed in the desktop switcher as a respective leaf 1406 of a human-computer interaction navigation path 1404 which branches initially at the desktop switcher; obtaining 1008 via the desktop switcher a user selection 1328 of the remote computer desktop thumbnail; and setting 1010 a current user interface desktop focus 304 on the local computer to be the remote computer virtual desktop. Accordingly, the method allows a user who is physically located at the local computer to operate 1310 the physically remote computer using the remote computer virtual desktop.

In some embodiments, the method includes specifying 1312 a remote computer virtual desktop 130 geographic location value 1408, or a remote computer 202 geographic location value 1408, or both, to be the same as a local computer geographic location value 1408 which matches a physical location of the local computer 202.

In some embodiments, the method includes displaying 1314 a remote computer application 122 thumbnail 132 and a local computer application 122 thumbnail 132 together in one of the computer virtual desktops 130.

In some embodiments, the method includes displaying 1016 a context menu 308 of the remote computer 202 in the desktop switcher 312 on the local computer 202.

In some embodiments, the method includes: the local computer communicating 1318 with a back end 208 to discover 1320 the remote computer 202; and in response to a result of the communicating 1318, the local computer determining 1322 at least one of: a remote computer compatibility 1410 for remoting, or a remote computer availability 1412 for remoting.

In some embodiments, the method includes changing 1010 the current user interface desktop focus 304 on the local computer from the remote computer virtual desktop 130 to the local computer virtual desktop 130.

In some embodiments, receiving 1004 the remote computer desktop thumbnail includes communicating 800 between a remoting client 604 and a shell 602 of the local computer virtual desktop.

In some embodiments, the method includes launching 1326 the desktop switcher 312 from at least one of the following: a shell 602, or a widget 310.

In some embodiments, the method includes displaying 1006 in the desktop switcher 312 on the local computer: multiple remote computer desktop thumbnails 132 representing 1302 respective remote computer virtual desktops 130, together with multiple local computer desktop thumbnails 132 representing 1302 respective local computer virtual desktops 130.

In some embodiments, the displaying 1006 includes displaying 1332 the remote computer desktop thumbnail 132 and the local computer desktop thumbnail 132 in the desktop switcher 312 as equals that are each selectable 1328 with a single respective click 1330.

In some embodiments, the displaying 1006 includes displaying 1332 the remote computer desktop thumbnail 132 and the local computer desktop thumbnail 132 in the desktop switcher 312 at the same menu depth 1402 as each other.

Some embodiments provide or utilize a method for virtual desktop utilization, the method performed (executed) by a local computing system, the method including: sending 1002, to a remote computer, a remote computer desktop thumbnail request; receiving 1004 a remote computer desktop thumbnail which visually represents a virtual desktop of the remote computer; displaying 1006 the remote computer desktop thumbnail in a desktop switcher on the local computer, together with a local computer desktop thumbnail which represents a virtual desktop of the local computer, the remote computer desktop thumbnail and the local computer desktop thumbnail each displayed in the desktop switcher as a leaf of the same navigation path (e.g., a display in a TaskView™ desktop switcher 312 presents CloudPC and local PC desktops as equals that are each selectable with a single click); obtaining 1008 via the desktop switcher a user selection of the remote computer desktop thumbnail; and setting 1010 a current user interface desktop focus on the local computer to be the virtual desktop of the remote computer. In this manner, this method allows a user who is physically located at the local computer to operate 1310 the physically remote computer using the remote computer's desktop on the local computer.

In some embodiments, operations such as the following are performed by a system 102 to get a remote computer desktop thumbnail. A local shell 602 will talk to a remoting client 604, e.g., MSRDC, through an API to request the remote desktop thumbnail. The remoting client will send a message to the remote computer through a network communication channel, e.g., DVC 806. On the remote computer side, corresponding components (e.g., a remoting app 902 with DVC capability 806) will receive the thumbnail request, and relay it to a remote shell 602. If the remote computer has multiple available desktops 130, it will provide them to the remote shell, which will convey information about them to the remoting app, and then their thumbnails 132 will be sent to the local computer remoting client, which will provide them to the local shell. Then the local shell with display 1006 the thumbnails (local and remote) in the desktop switcher 312.

In some embodiments, all of the active desktops 130 on the remote computer are presented in the local UI 124 as desktops 130, e.g., in the desktop switcher UI 402, 124. In some embodiments, only a primary remote desktop 130 is presented locally. In some embodiments, all of the active desktops 130 on the local computer are presented in the remote UI 124 as desktops 130. In some, only a primary local desktop 130 is presented when a remote VD 130 has the UI focus 304. Thus, VD thumbnails 132 may be transmitted in either direction between the local and remote computers. In some embodiments, the thumbnails 132 are snapshots taken at or near the beginning of a session 608, while in other embodiments thumbnails 132 are updated 1306 during a remoting session, periodically or in response to trigger events that modify the desktop 130 represented 1302 by the thumbnail 132.

In some embodiments, a visual separator 1102 is displayed 1308 in the desktop switcher between a set of one or more local desktop thumbnails or an icon 1202 representing local desktops, on the one hand, and a set of one or more remote desktop thumbnails or an icon (e.g., FIG. 12 "CLOUD PC" icon 1202) representing remote desktops, on the other hand. For instance, a vertical or horizontal bar (line segment), or a gap between local and remote desktops or their icons, may be displayed 1308 as a visual separator. FIGS. 11 and 12 show some examples. Although these examples show a row of thumbnails or icons representing thumbnails, in some embodiments or configurations a column or a grid or another layout is used instead.

In some embodiments, the remote computer resides 1304 in a cloud 134. In others, the remote computer resides on a non-cloud network 108.

In some embodiments, the method further includes changing 1010 focus back from the virtual desktop of the remote computer to the virtual desktop of the local computer. One data flow for this is shown in FIG. 7.

In some embodiments, the method further includes sharing 1012 the same clipboard 306 between the virtual desktop of the remote computer and the virtual desktop of the local computer. For instance, a user may copy or cut data 118 from a document displayed in an app 122 in one virtual desktop 130, switch the focus to a different virtual desktop 130, and then paste that data 118 from the clipboard 306 into an app 122 in that different virtual desktop 130. The clipboard data may be transferred 1342 using data flow steps and mechanisms such as those used for thumbnail transfer, e.g., per one or more of FIG. 6, 7, 8, or 9.

In some embodiments, the method further includes displaying 1014 remote computer application thumbnails 132 and local computer application thumbnails 132 together on the same virtual desktop, e.g., per FIG. 4 in the case where VD A is a local virtual desktop and VD B is a remote virtual desktop. Widgets 310 and tools 122 are examples of applications as far as this sharing functionality is concerned. So are word processors, spreadsheet apps, presentation apps, etc. The app data may be marshaled 1344 on a given virtual desktop, and then transferred 1342 to a different virtual desktop using data flow steps and mechanisms such as those used for thumbnail transfer, e.g., per one or more of FIG. 6, 7, 8, or 9.

In some embodiments, the method further includes sharing 1312 the same geographic location data 1408 between the virtual desktop of the remote computer and the virtual desktop of the local computer. For instance, a user physically located, together with a local computer, at a location A may interact via a remote VD with a remote computer that is physically located at a location B. However, so far as the remote computer's own applications are concerned, and so far as inquiries to the remote computer from other computers are concerned, the location 1408 of the remote computer while the remote VD has the focus is location A. The geographic location of a user 104 running a cloud PC, for example, would be the geographic location of the user 104, not the geographic location of the computer 202 running the cloud PC's operating system 120. The geographic location data 1408 may be transferred using data flow steps and mechanisms such as those used for thumbnail transfer, e.g., per one or more of FIG. 6, 7, 8, or 9. Geographic location data 1408 may be represented, e.g., as GPS (global positioning system) coordinates, or in terms of city, state, province, country, or similar designations, or both.

In some embodiments, the method further includes displaying 1016 a context menu 308 of the remote computer in the desktop switcher on the local computer. For example, a cloud PC desktop context menu 308 may be displayed in a local PC desktop switcher 312. Context menu items 808 and menu item selections may be transferred using data flow steps and mechanisms such as those used for thumbnail transfer, e.g., per one or more of FIG. 6, 7, 8, or 9.

In some embodiments, the method further includes a local computer communicating 1318 with a back end 208 to discover 1320 the remote computer, and determining 1322 remote computer compatibility 1410 (e.g., OS version) and availability 1412 (e.g., license status, data center availability) for remoting based at least in part on a result of that communication.

Some embodiments include one or more similar methods, but from the remote computer point of view instead of the local computer point of view. FIG. 7 shows an example with thumbnails, which can be expanded for sharing 1012 a clipboard, sharing 1014 apps, or displaying 1016 a context menu, for example, when the current focus 304 is a remote (from the user) machine's virtual desktop.

One of skill informed by the teachings provided herein will acknowledge various technical benefits of one or more embodiments.

Unlike remoting approaches that use a session manager tool or similar app 122 on the local computer to access a remote computer, some embodiments use a desktop switcher 312. This functionality improves the efficiency, availability, and ease of human-computer interaction.

The desktop switcher 312 presents 1332 the local and remote desktops 130 as equals in terms of accessibility for use. Any one of them is as easily selected 1328 as the other (e.g., no additional app or tool or shell window launch is needed, and no additional clicks are needed—the only difference is in the cursor's position to indicate the thumbnail being selected). This functionality also improves the efficiency, availability, and ease of human-computer interaction.

After the remote desktop 130 is selected, it has the user interface focus 304 instead of the local desktop having the focus. From the user's perspective 124, the user is working 1310 directly with the selected remote desktop, not working inside an app or shell of the local desktop. This functionality also improves the efficiency, availability, and ease of human-computer interaction.

Some embodiments provide or utilize a deep integration of the method 1300 of accessing a remote desktop into the local Windows® or other operating system 120 interface with a corresponding efficient user experience. Connecting machines via shells 602 instead of through a separate remoting session management application also helps reduce memory requirements, CPU cycles, GUI processing, and other computational resource usage.

By caching thumbnails 132, connection information such as IP addresses and session 608 info, local and remote state information, and other data 118, some embodiments reduce the processing 110 cycles and memory 112 required to re-establish remote connections, and reduce system 202 response time.

Some embodiments represent 1302 remote desktops as closely as possible to local desktops, in terms of user interface navigation 1340, speed of switching 1010 between desktops, associated functionalities such as context menus 308, or a combination thereof. Some embodiments represent remote desktops in the Task View feature (a desktop switcher 312) on the local machine 202. These embodiments provide more accessible, easily navigable, and efficient human-computer interaction than other approaches, e.g., approaches that access a remote desktop by running the remote desktop in an application window of the local desktop, or by running the remote desktop either as a full screen replacing the local desktop or not at all, without presentation of local and remote desktops as equal alternatives.

In some embodiments, a distinction is made in that display of available desktops and switching between desktops is performed by or via a desktop switcher 312, whereas display of available tasks (e.g., application windows or application dialogs) and switching between tasks is performed by or via a task switcher. This distinction is presumed herein, but may be expressly overridden. In some embodiments, desktop switcher functionalities and task switcher functionalities are integrated into a single switcher; this is not presumed herein.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as virtual desktops 130, virtual desktop utilization software 302, thumbnails 132, clipboards 306, context menus 308, and remoting protocol components such as components 604, 806, and 902, in the form of data 118 and instructions 116, read from a removable storage medium 114 and/or another source such as a network connection, to form a configured storage medium. The configured storage medium 112 is capable of causing a computer system 102 to perform technical process steps for virtual desktop utilization, as disclosed herein. The Figures thus help illustrate configured storage media embodiments and process (a.k.a. method) embodiments, as well as system and process embodiments. In particular, any of the process steps illustrated in FIG. 6, 7, or 10, or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a computing system to perform virtual desktop utilization facilitation method 1300, which may include any one or more of the computational actions taught herein.

In some embodiments, a computer-readable storage device 112 is configured with data 118 and instructions 116 which upon execution by a processor 110 cause a computing system 202 to perform a virtual desktop utilization method 1300. In this context, a current focus computer is a computer which currently has a user interface desktop focus 304, and the method includes: displaying 1006 in a desktop switcher 312 a remote computer desktop thumbnail 132 which represents a remote computer virtual desktop 130, together with a local computer desktop thumbnail 132 which represents a local computer virtual desktop 130, the remote computer desktop thumbnail and the local computer desktop thumbnail each displayed 1332 at the same user interface navigation level 1402; and communicating 1342 at least one of the following between the remote computer and the local computer: a context menu 308 of a virtual desktop for a computer other than the current focus computer, an application thumbnail 132 of an application instance 122 installed on a computer other than the current focus computer, a content of a clipboard 306 which is configured to be shared using network communication between the virtual desktops of physically separated computers, or a virtual desktop geographic location value 1408.

In some embodiments, the communicating 1342 communicates the context menu 308 of the virtual desktop for a computer other than the current focus computer.

In some embodiments, the communicating 1342 communicates the application thumbnail 132 of the application instance installed on the computer other than the current focus computer.

In some embodiments, the communicating 1342 communicates the content of the clipboard 306 which is configured to be shared using network communication between the remote computer virtual desktop and the local computer virtual desktop.

In some embodiments, the communicating 1342 communicates the virtual desktop geographic location value 1408.

Additional Observations

Additional support for the discussion of virtual desktop utilization functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

In some embodiments, Windows® software users can easily switch between a Local PC and a Cloud PC OS in a Windows® shell. Windows 365® technology (or "Cloud PCs") puts Windows® environments in the cloud, allowing users to access their cloud PC from any device. Some embodiments improve Windows® software integration with Cloud PCs, particularly helping users switch between Cloud PCs and Local PCs faster. This will help users navigate the challenges of hybrid work, as a highly differentiated experience for quickly switching between local and Cloud PC will give Cloud PC users a reason to choose Windows® environments and bring Windows®-software-equipped devices to work. Some embodiments make it possible to switch between a Windows® environment that runs on a local PC and an environment in a Microsoft 365 Cloud via Windows 365™ software. However, teachings herein are not limited to Microsoft product or service environments. Some embodiments help users move from a device-oriented environment 100 to a device-agnostic environment 100 while maintaining the same shell functionality and ease of use.

In some embodiments, a switching experience to a cloud 134 or other remote environment 100 is seamless and simple, and the remote environment user interface 124 is consistent with the local environment user interface 124. In particular, user interaction with the cloud experience parallels the local experience, so there is no additional UX learning curve. However, the interface and the switching experience make it clear to the user which device 202 they are currently controlling, e.g., by showing a confirmation after the VD switch (VD stands for Virtual Desktop).

In some embodiments, no setup is required by the user 104 beyond the licensing and configuring of the remote environment 100 that would occur regardless of fast switch capability.

In some embodiments and some network configurations and usage scenarios, a response time for switching 1010 to or from a Cloud PC is no more than 5 seconds greater than an average response time for switching between local VDs (virtual desktops). In some, the response time is no more than 3 seconds greater than the average response time for switching between local VDs. In some, the response time from when the user selects a VD to the display of that VD as the current VD takes less than 1 second, and in some it takes less than 500 milliseconds.

In some embodiments, a user will be automatically logged on 1344 to the remoting client or host or both as needed if the endpoints involved are managed. In unmanaged scenarios, a user will be prompted 1344 to authenticate.

In some (perhaps all) embodiments, a user will be able to switch 1010 back to the local desktop using navigational actions that mirror switching to the remote desktop. For instance, each switch may include (or consist of) moving a UI focus to TaskView or another desktop switcher 312, and then selecting a switch target 130 from a set of VD thumbnails 132.

Some embodiments extend the functionalities described herein to support switching 1010 between a local VD and multiple remote VDs.

Some embodiments support displaying different VDs on respective physical monitors 126, e.g., displaying the local VD on one screen and displaying a cloud VD on a second adjacent screen. Some allow a given cursor, or UI focus, or both, to move between these VDs.

Some embodiments support sharing 1014 by dragging and dropping applications or windows or other GUI items and what they represent between VDs 130, e.g., between a local VD and a remote VD, or between two remote VDs. In this example, as elsewhere herein, it is contemplated that the remote VD will typically be a cloud device VD. In some embodiments, moving applications between VDs is not supported, but showing which apps 122 are on which VDs is supported. For example, a VD support functionality may gather app thumbnails and IDs 1414, and transmit them using a data flow similar to that shown in the Figures, via RDP, extended RDP, or another remoting protocol functionality.

Some embodiments support moving data 118 between VDs, e.g., between a local VD and a remote VD, or between two remote VDs. In particular, in some embodiments a single clipboard 306 is shared by multiple VDs.

In some embodiments, a display theme 1416 of TaskView or another desktop switcher 312 is set to match the current theme 1416 of the current VD.

In some embodiments, hovering over an icon for TaskView or another desktop switcher brings up a VD flyout with preview thumbnails. Clicking a VD thumbnail then selects the corresponding VD and causes switching from the current VD (and the device that VD represents) to the clicked-on (i.e., selected) VD and the device that the selected VD represents.

In some embodiments, hovering 1344 over a VD thumbnail in the desktop switcher, or hovering over another specified location in a user interface, brings up a preview 404 of the corresponding VD that shows which windows are open in that VD. This hovering does not cause a VD switch 1010; the VD must be clicked on or otherwise affirmatively selected as a VD switch target.

In some embodiments, the order of VD thumbnails 132 shown in TaskView or another desktop switcher 312 is the same for each VD 130. In some, the local device VD thumbnail is always at the same location, e.g., always in the leftmost position in a row of VD thumbnails, or always in the top left position in a grid of VD thumbnails.

In some embodiments, a right mouse click 1330 or other designated UI action 1344 on a VD thumbnail will cause a context menu 308 for the VD to be displayed 1016. Selecting a VD context menu item then causes performance of the functionality that context menu item 808 identifies. VD context menu items may include, e.g., Rename|Move right|Choose background|Desktop settings|Cloud PC options>|Disconnect|Close. "Change wallpaper" is another name for "Choose background". These are example menu items; a given context menu may have only some, or none, of these example items.

In some embodiments, the VD task switch 1010 is performed via a kernel 120 or utility 122 such as TaskView. In some, user interaction with the desktop switcher 312 is via a mouse 106, a keyboard 106 shortcut, a trackpad 106, or a touch screen 126.

In some embodiments, the VD switching 1010 is seamlessly integrated into a kernel 120 or a kernel shell 602, so the user navigational experience is like switching between VDs or switching between app windows locally, but the network connections happening transparently in the background and the other supporting mechanisms described herein permit a rapid switch between local and cloud VDs. The network connections are secured, e.g., by encryption, authentication, and other cybersecurity mechanisms. In some cases, the cloud VD runs in a datacenter. In some cases, single sign-on functionality is employed to authenticate and login to the cloud VD.

In some embodiments, remote desktop protocol (RDP) or another remoting protocol is used. In some embodiments, RDP has been extended to support a thumbnail transmission protocol. In some, RDP has been extended to support transmission of a notice from a remote VD to a local shell to return control to the local shell.

Example architecture diagrams and example data flow diagrams are provided in the Figures. FIGS. 1-9, 11, 12 each show at least architectural aspects, and FIGS. 1, 2, 6-10 each show at least data flow aspects.

In some embodiments, cloud PCs are on an equal presentation level with the local PC in a desktop switcher. In some embodiments, the same selection mechanism or selection sequence is used to select a cloud VD as to select a local VD. The selection of a cloud VD differs only as to which particular item is selected (the cloud device represented by the cloud VD thumbnail), not as to menu depth 1402 or use of separate tool 122, for example.

In some configurations, a user's personal (e.g., outside the scope of an employment or profession) apps and data are run locally and stored locally or in a personal cloud account, whereas the user's work apps and data are run on the cloud device via the cloud VD and stored in a cloud account associated with the cloud device. This allows, e.g., a convenient but clear and securable separation of personal and employer data and responsibilities for app maintenance, as well as making more processing power, storage, and network bandwidth available for work when it is needed (and when it is presumably also authorized and paid for by the employer). For instance, enterprise software-as-a-service applications such as customer relationship management, enterprise resource planning, business intelligence, database, and the like may be easily available as needed yet remain secured.

A user may switch 1010 back from the cloud PC to the local PC using the same desktop switcher UX. In some embodiments, this includes the system suspending 1344 and hiding an RDP session or similar remoting session 608.

In some embodiments, in addition to a VD switch launch point in a desktop switcher 312, or instead, a VD switch launch point is provided in a widget 310 (a small desktop app previously used for showing, e.g., weather, time, stock market info, or the like).

The Cloud PC Architecture diagram in the Figures shows a local PC and a remote cloud PC. More generally, the local device may be any device 102 and the remote device may be any remote device 102. However, the remote device is presumed to a be a virtual device implemented in a cloud 134 unless stated otherwise. For present purposes, "remote" means any of: not within the sight range of a user at the local device, more than 100 meters away from the local device, or implemented as a cloud device when the local device processor is not in that cloud. Similarly, two computers X and Y are "physically remote" from one another or "physically separated" from one another when any of the following conditions are met: a user at X is not within the sight range of a user at Y, X is more than 100 meters away from Y, or X is implemented as a device in a given cloud when Y's processor is not in that cloud.

Explorer is an example of a shell 602, but other shells may be used in other embodiments, e.g., bash or C shell.

In this example, Windows 365® App is used as a service provider interface 810 to discover 1320 the cloud PC shortly after the user logs on locally. In other embodiments, other remote device discovery functionality may be used. The discovery app 810 communicates with a back end service 208 to discover what cloud devices are associated with the logged in user, if any, and to get version numbers and remoting capabilities, subscription status, and other compatibility 1410 and availability 1412 data.

In this example, the compatibility and availability data is communicated to a cloud desktop host 802 (and hence to a shell 602) via a cloud desktop availability API 804, but in other embodiment other mechanisms may be used. For instance, the cloud device discovery functionality could be integrated in the remoting host 902. Indeed, the remoting host or the cloud device discovery functionality or both could be integrated into a shell 602, or into a kernel 120. Embodiments include those with a shell separate, as well as those in which the shell is effectively integrated into the kernel as an embedded kernel user interface.

Similarly, the cloud device discovery functionality could be integrated in the remoting client 604. Although MSRDC (Microsoft Remote Desktop Client) is one suitable remoting client, other kinds of remoting clients may be used in addition, or instead, in other embodiments.

After the shell 602 gets the result of the cloud device discovery 1320, the shell can show a connect button in the desktop switcher, assuming at least one available and compatible cloud device is discovered. The connect button may be shown, e.g., as a thumbnail 132 of the cloud device's VD 130. Some embodiments only show the cloud device as an option after a connection from the local device to the cloud device has been established 1344 and tested in the background (that is, without notifying the user). Other embodiments wait until the user requests a switch 1010 to the cloud device (using a connect button that does not necessarily show the cloud device VD thumbnail), and then try to connect to the requested cloud device.

After the user connects to the cloud, MSRDC or other remoting client 604 talks to the remote shell 602, via the remoting host 606. This communication over a network (e.g., the internet) is executed, e.g., to request and receive VD thumbnails per the FIG. 6 data flow diagram, and also to relay user commands from the local device to the remote device and to carry back the remote device's VD updated in response to those user commands.

One example includes an RDP App in direct communication over the network link to MSRDC or another remoting client. But in some embodiments the RDP App functionality is integrated into the remote host 606, e.g., a host which also has functionality provided (in the Figures example) by the Cloud Desktop Host 802, which may be or include an immersive shell component.

In some embodiments, the shell and the remoting client/remoting host are distinct processes, so a mechanism is provided to permit them to communicate to perform, e.g., per the data flow in the Figures. On the local side, this mechanism includes a Cloud Desktop Provider API 812 and the Cloud Desktop Host 802, while on the remote side a similar mechanism includes the Cloud Desktop HOST API 904 and another instance of the Cloud Desktop Host 802. In some embodiments, a cloud desktop data model 814 and a cloud desktop provider 816 permit cross-process communication when a shell and a remoting-client are distinct processes. Other embodiments may use other cross-process communication mechanisms. As noted, in some embodiments, such mechanisms are not present because the shell functionality and the remoting client/remoting host functionality are integrated within a single process per device.

In this example, the cloud desktop data model 814 includes data for tracking sessions 608 with remote computers, remote computer IDs, and desktop IDs. "ID" means identifier. For instance, in some embodiments the cloud desktop data model includes a structure of hierarchically organized data such as the following ("[ ]" indicates an array):
CloudPC sessions [ ]
    CloudPC ID
    Virtual desktops [ ]
        VD name
        Thumbnail image data In a variation, the array of VD data structures could also include context menu data, e.g., an array of menu item commands 808 with respective names for display and TYPEs as operation identifiers. The context menu 308 may be specific to a particular VD 130, or may apply to multiple VDs 130. For example, the cloud desktop data model may include a structure of hierarchically organized data 118 such as the following:
CloudPC sessions [ ]
    CloudPC ID [ ]
    Virtual desktops [ ]
        VD name
        Thumbnail image data
    Commands [ ]
        Name
        TYPE In another variation, some or all of the context menu data for a given remote computer may be obtained from the remote computer service provider (e.g., Windows 365® services) 208 along with the data 1412 on remote computer availability and remote computer compatibility data 1410.

Some or all of the cloud desktop data model data may be cached on the local computer, on the remote computer, or on both.

In this example architecture, the cloud desktop availability API 804 provides management functionality, e.g., ascertaining or setting availability 1412, or requesting updates to change compatibility 1410. By contrast, the cloud desktop provider API 812 provides communications 1342 functionality, e.g., for transmission of desktop thumbnails, application thumbnails, clipboard content, or geographic location data, between local and remote computers.

In some embodiments, communications between local and remote computers may progress through stages that include acquiring, connecting, switching, and then disconnecting. An OS settings stage may also be present, as an interjected stage at any point. Acquiring includes obtaining availability and compatibility information about one or more remote computers (e.g., cloud PCs). Connecting includes creating a communication session 608 between the local computer and a remote computer. Switching includes making a VD of the connected remote computer the current user interface focus on the local computer (a) without putting local VDs at a greater navigational distance (button clicks, key presses, spoken commands, etc.) from a user perspective than the navigational distance between any two local VDs, or (b) without requiring termination of the session with the remote computer as a condition of later switching back to the local VD as focus, or both. Disconnecting includes switching focus back to a local VD, and possibly but not necessarily ending the local-remote session; the session 608 may be simply suspended in case the user wants to rapidly switch back to the remote VD.

In some embodiments, the switch 1010 to a cloud PC differs from a switch from one local VD to another local VD in various ways, including the use of a remoting session 608. When the user clicks a remote VD thumbnail, the shell uses the desktop provider API 812 to have the remoting client 604 establish the session. In a variation, the shell 602 uses the desktop availability API 804 to have the remoting client establish the session. The communications between the desktop switcher 312, local shell 602, local APIs 804, 810, 812, remoting client 604, remoting host app 902, remote API 904, remote desktop host 802, and remote shell 602 are transparent to the user 104, except to the extent they are indicated by interstitial screens 502, progress bars, or other visual or auditory progress indicators at the level of "checking for cloud PCs", "connecting to your cloud PC", or the like.

In one example architecture, a cloud desktop provider kickstart 818 performs remote computer acquisition during the acquiring stage. When a user logs onto an operating system on a local computer, the desktop switcher does not necessarily know whether the user has access rights to a remote computer. So the local computer requests 1318 availability and compatibility information from the remote computer service provider 208. In the example architecture, this inquiry is performed using an availability request, identifying the user, sent from the cloud desktop provider kickstart component 818 to the back end 208 access service Windows 365® app, via the cloud desktop availability API 804. The remote computer service provider will know whether the identified user has a remote computer account, and the availability and compatibility information of such an account if one is detected. The availability and compatibility information is transmitted from the remote computer service provider to the shell via the APIs 810, 804 and host 802 as shown in FIG. 8. Then the appropriate thumbnails or thumbnail icons are provided to the desktop switcher (e.g., TaskView) for display.

In this example, when a user clicks on a cloud PC button, the following operations are performed. TaskView (or other desktop switcher 312) passes the selected cloud PC ID to the shell, which uses it via the availability API 804 to notify Windows 365® app (or other remote computer service provider interface 810) that the user wants to start (or re-enter) a remote desktop session 608 (e.g., use a cloud PC 202). The desktop provider will create a new session using the remoting client 604, to connect with the remote desktop. In some embodiments the remoting client is started by the remote computer service provider interface 810, e.g., MSRDC is started by (e.g., spawned, launched) by the Windows 365® app component.

Some embodiments check remote computer availability, and then if a remote computer is available the remote computer desktop thumbnail is shown in the desktop switcher. This may be a generic remote computer desktop thumbnail, or a thumbnail from a previous session 608. In some embodiments the remoting connection is not made via the remoting client until after a user actually clicks on (or otherwise selects) the remote computer desktop thumbnail.

Some embodiments track open session(s) 608, and perform an auto-reconnect to re-establish sessions that were not closed in response to an express command from the user to close. For instance, sessions that were open when a system restart began, or when connectivity was lost, could be automatically re-established. In particular, a restart might be due to a system update of the local computer or an update of the remote computer, which would then trigger automatic re-establishment of the local-remote session via the remoting client 604 and remoting host 606. The re-establishment is automatic in the sense that it does not require any additional user actions to indicate user intent to use the remote VD, such as clicking again on the remote computer VD thumbnail. Some or all of the VD thumbnails may be cached on the local computer, on the remote computer, or on both.

In some embodiments, when the network connection to the remote computer is lost and the focus 304 is on a local VD, the network connection is automatically re-established but the session is not re-established unless and until a VD 130 on the remote computer is selected to receive the UI focus. When a network connection or a session is being re-established, and again when the connection or a session has been re-established, the remoting client notifies the local shell via the desktop provider API 812.

In some embodiments, when focus 304 is switched from a remote VD to a local VD, the session 608 is suspended but the underlying network connection is maintained.

In an example architecture, the DVC (Dynamic Virtual Channel) plugin 806 is an extension of RDP used to facilitate data transmission in an RDP session 608.

In an example architecture, a cloud desktop window manager component 820 manages display operations such as giving a VD full screen, minimizing a VD within the screen 126 display area, and showing interstitial screens.

In an example architecture, a context menu commands component 808 manages context menu 308 content and availability. A context menu may be displayed 1016, e.g., in response to the user receiving a mouse right button click or a click on an icon such as an ellipsis (three dots) that indicates context menu availability. The context menu will include a list of menu items, also called menu options. The list may be provided, e.g., by the remote computer server API, e.g., the Windows 365® app, as one example of remote computer configuration data.

When a context menu item on a remote VD is selected by the user, that selection is transmitted from the context menu commands component 808 via the remoting session (as discussed elsewhere herein for thumbnails) to the remote shell, which attempts to perform the requested context menu item operation. For instance, a rename context menu command would change name data in the remote computer, and other commands would similarly be implemented in the remote computer.

In some cases, the requested command is performed by the remote computer server API, e.g., the Windows 365® app. A result code for the attempt is conveyed back along the communication path to the local computer for display, e.g., to indicate success or an error message. In some embodiments, different remote computers, or different remote VDs, may have different respective context menus 308. More generally, in some embodiments the remote computer server API, e.g., the Windows 365® app, monitors the remoting client, e.g., MSRDC, for departures of the remoting client from correct and efficient operation. Lack of such operation by the remoting client may be reported to the availability API as a lack of availability of the remote computer.

Some embodiments have an offline mode, which buffers user inputs to a remote VD when the connection or session is not active, and then transmits them when the connection and session are both again active.

An identity token 822 in the example architecture refers to a cloud PC or other remote computer identity. It may be implemented, e.g., as a GUID (globally unique identifier). It is not a user identity or a user authentication credential. A given user may have multiple cloud PCs or other remote computers, which are distinguished from one another in the example architecture and data flow using the identity token 822. Authentication and login are handled by local computer and remote computer provider mechanisms in a same or similar manner to systems which lack the present functionalities for rapid switching between local and remote VDs.

APIs 804, 812, 904, for example may be versioned, such that versioning and version checks for compatibility may be prudent.

An interstitial screen 502 is a transitional screen in a user interface, which may also be used to show progress. It may be displayed, e.g., as a connection with a remote device is being made but not yet ready for use. The interstitial screen may include a message, e.g., "connecting to cloud device Solar1 . . . "

Some embodiments permit control of settings, e.g., update settings, for local or remote devices. Settings control may be provided, e.g., via a Settings App 824. A Cloud Desktop Interaction Setting may include, provide, or control, e.g., a UX and a Handler.

Provisioning 906 involves installing functionality in a cloud device.

In some embodiments the host API mirrors the desktop provider API.

In some embodiments a host return UX 908 allows the user to return from the cloud device and its VD to the local device VD.

Some embodiments provide an immersive integration of the remote computing experience into the experience of the local computer's shell. This immersive integration is evident, for example, in the transparency of steps 1002, 1004, 1318, 1320, 1322, 1334, 1342, the avoidance 1324 of a separate sessions tool, the equal treatment 1332 of local and remote VDs in terms of navigational aspects 1340, 1402, and the sharing functionalities in steps such as 1012, 1014, 1016, 1312, 1314, 1316. These aspects individually and collectively distinguish embodiments from remote computing experiences that rely on a separate remoting application that renders the remote experience inside its window, which is just one of many windows running on a local computer desktop, and remote computing experiences that feel like merely running a different operating system inside a window. Teachings presented herein support mechanisms, e.g., per FIGS. 6-9, that allow seamless integration of a remote PC experience into the local PC shell, so that the user feels switching to the remote PC is as quick and easy as switching between their local virtual desktops.

Some embodiments provide or utilize a method of enabling a remote desktop provider application to register with the local shell 602, including metadata like names and thumbnails, and to register experience components such as rendering windows. Some embodiments provide or utilize a mechanism for manipulating the registered rendering windows so that they visually appear to be integrated with the local shell 602. This integration may include, e.g., resizing and repositioning the windows of a desktop, hiding and showing them, and placing them on special shell surfaces like hidden virtual desktops or higher z-order bands.

Some embodiments provide or utilize a method of altering a local shell 602 to present the remote desktop provider functionality as an immersive UX experience which the user perceives as being an extension of the local shell. Some embodiments provide or utilize a mechanism 820 for hiding all the local shell UX and app windows while the user is in the immersive remote experience. Some embodiments provide or utilize a mechanism 820, 312, 802 to restore 1010 that local experience seamlessly once the user has chosen to exit the immersive remote experience.

Some embodiments provide or utilize an omnipresent way for the user to return 1010 to the local experience from the immersive remote experience if that experience becomes unusable or corrupted, e.g., per FIG. 7. Some embodiments provide or utilize a mechanism 830 for detecting when the remote experience becomes unusable or corrupted, including but not limited to providing a way for the remote experience to report such problems itself and ways of automatically detecting some problems. Some embodiments provide or utilize a user experience that transitions 1010 the user from the remote experience through a temporary landing experience 502 where the problem is explained to the user and options are provided to remedy or exit the remote experience. Some embodiments detect an error condition (e.g., bad network, hung app, crash) by automation or by an explicit signal from a desktop source or service provider, and take appropriate action, e.g., showing an additional UX, restarting an alternate desktop, etc.

Technical Character

The technical character of embodiments described herein will be apparent to one of ordinary skill in the art, and will also be apparent in several ways to a wide range of attentive readers. Some embodiments address technical activities such as transferring data over a network 108, displaying data in a user interface 124, and utilizing virtual desktops 130 in various computational activities, which are each an activity deeply rooted in computing technology. Some of the technical mechanisms discussed include, e.g., virtual desktops 130, remoting protocol components, context menus 308, and software 302. Some of the technical effects discussed include, e.g., rapid switching between virtual desktops 130, and presentation of remote virtual desktops 130 on a local machine at the same user interface navigational level as local virtual desktops 130. Thus, purely mental processes and activities limited to pen-and-paper are clearly excluded. Other advantages based on the technical characteristics of the teachings will also be apparent to one of skill from the description provided.

Different embodiments may provide different technical benefits or other advantages in different circumstances, but one of skill informed by the teachings herein will acknowledge that particular technical advantages will likely follow from particular innovation features or feature combinations. For example, giving 1332 equal navigational access 1402 to remote VDs as to local VDs removes human-computer interaction hindrances such as needing to install, invoke, and learn a separate session management application for remoting. Sharing 1012 a clipboard 306 between remote VDs and local VDs facilitates document editing and other interactions, since otherwise the shared clipboard data would need to be either recreated (e.g., re-typed) at the remote computer or be transmitted to the remote computer by concentration-breaking steps such as a file transfer or an email.

Other benefits of particular steps or mechanisms of an embodiment are also noted elsewhere herein in connection with those steps or mechanisms.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to efficiently and effectively switch between virtual desktops 130 of physically local and remote systems. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVC: Dynamic Virtual Channel
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
LAN: local area network
MSRDC: Microsoft Remote Desktop Client
OS: operating system
PaaS or PAAS: platform-as-a-service
PC: personal computer
RAM: random access memory
RDP: remote desktop protocol
ROM: read only memory
TPU: tensor processing unit
UEFI: Unified Extensible Firmware Interface
UI: user interface
UX: user experience
VD: virtual desktop
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones via an HDMI (high definition multimedia interface) adapter, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Virtual desktop utilization operations such as transferring thumbnails 132 between local and remote systems, displaying thumbnails on a screen 126, and many other operations discussed herein, are understood to be inherently digital. A human mind cannot interface directly with a CPU or other processor, or with RAM or other digital storage, to read and write the necessary data to perform the virtual desktop utilization steps taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac gadget" and that claim limitation became subject to means-plus-function interpretation, then at a minimum all structures identified anywhere in the specification in any figure block, paragraph, or example mentioning "zac gadget", or tied together by any reference numeral assigned to a zac gadget, or disclosed as having a functional relationship with the structure or operation of a zac gadget, would be deemed part of the structures identified in the application for zac gadget and would help define the set of equivalents for zac gadget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as communicating, connecting, determining, displaying, focusing, getting, hiding, obtaining, receiving, sending, setting, sharing, switching, transferring, utilizing (and communicates, communicated, connects, connected, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

102 computer system, also referred to as a "computational system" or "computing system", and when in a network may be referred to as a "node"

Figure 13:
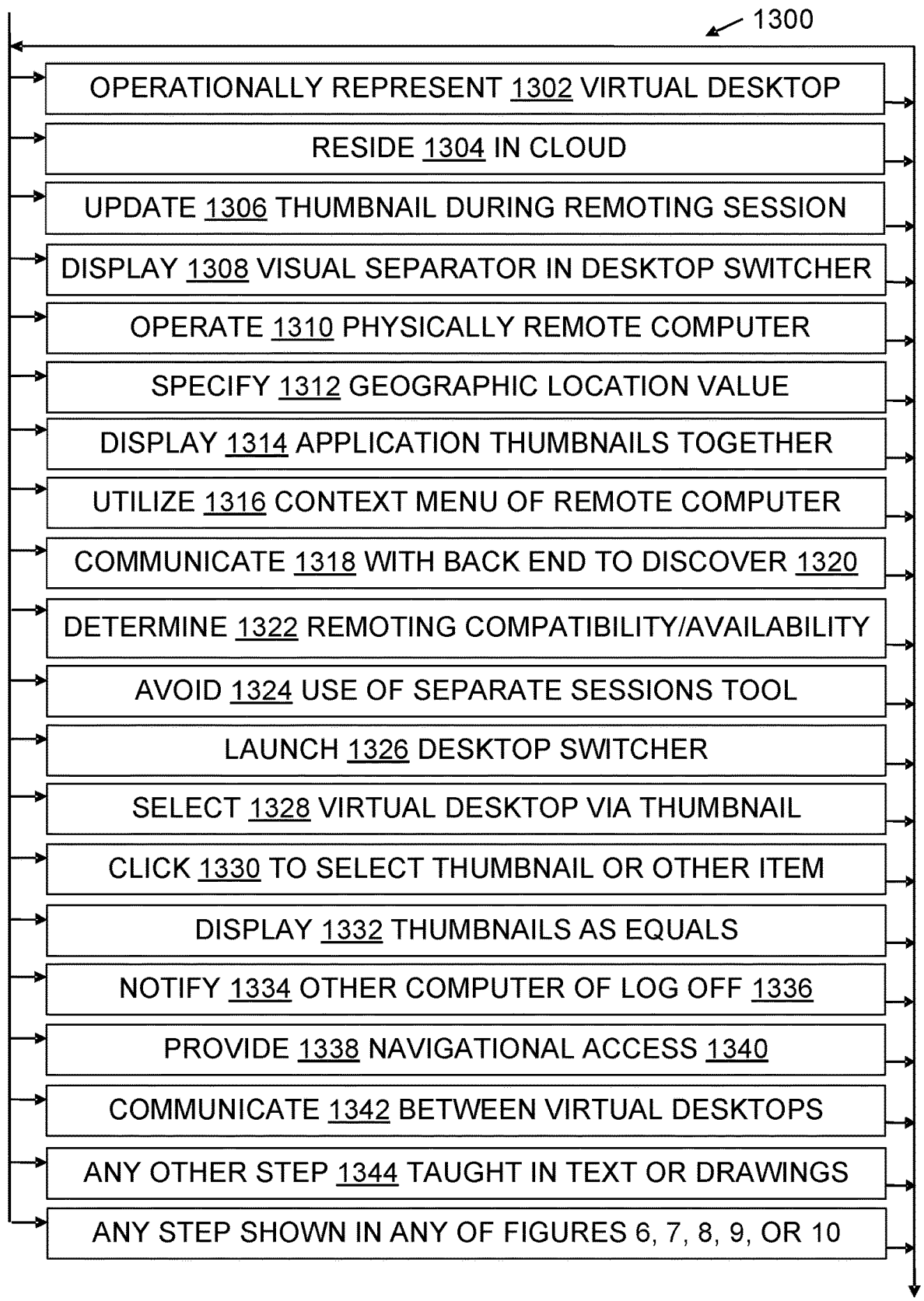
FIG. 13 is a flowchart further illustrating steps in some virtual desktop utilization methods, incorporating steps shown in FIGS. 6 through 10.

104 users, e.g., user of an enhanced system 202; refers to a human or a human's online identity unless otherwise stated
106 peripheral device
108 network generally, including, e.g., LANs, WANs, software-defined networks, clouds, and other wired or wireless networks
110 processor; includes hardware
112 computer-readable storage medium, e.g., RAM, hard disks
114 removable configured computer-readable storage medium
116 instructions executable with processor; may be on removable storage media or in other memory (volatile or nonvolatile or both)
118 digital data in a system 102
120 kernel(s), e.g., operating system(s), BIOS, UEFI, device drivers
122 tools, e.g., version control systems, cybersecurity tools, software development tools, office productivity tools and other apps, social media tools, diagnostics, browsers, games, email and other communication tools, commands, and so on; "app" and "application" are used interchangeably herein with respect to software products
124 user interface; hardware and software
126 display screens, also referred to as "displays"
128 computing hardware not otherwise associated with a reference number 106, 108, 110, 112, 114
130 virtual desktop, e.g., a graphical user interface mechanism providing a user with interaction access to apps, and perhaps to an underlying kernel, allowing the user to be informed about or to guide (usually both) the operation of a computing system; a "desktop" (a.k.a. "desktop environment") implements a graphical user interface reminiscent of a physical desk which has a work space on top where folders, documents, and other items can be placed; the kind of item placed most often on software desktops is perhaps applications; a "virtual desktop" on a given computer is a desktop which is locally accessible or is remotely accessible from another computer (subject to the establishment of a network connection, suitable permissions, and the health of both computers); a virtual desktop being accessed remotely may be referred to as a "remote desktop"; a service which makes a virtual desktop accessible for remote use may be referred to as a "hosted desktop service"; a window or application user interface displaying a set of remoting sessions (which are not necessarily sessions with virtual desktops but may instead be file transfer sessions or text-only sessions) may be referred to as a remoting "console"; a virtual desktop source may be, e.g., a Windows 365® or other cloud-based provider, a first-party cloud service, a third-party cloud service, a local hypervisor, a local sandbox service, other another desktop source which can be integrated into communication with an enhanced system for virtual desktop utilization as taught herein
132 thumbnail image, e.g., of virtual desktop or of app
134 cloud, cloud computing environment
202 system 102 enhanced with virtual desktop utilization functionality 204
204 functionality for virtual desktop utilization as taught herein; e.g., software or specialized hardware which performs or is configured to perform steps 1000 or their mirror steps, or any software or hardware which performs or is configured to perform a virtual desktop utilization method (computational activity) first disclosed herein
206 virtual desktop capabilities, e.g., launching apps, providing I/O for interaction between a user 104 and an app, clipboard functionality, context menu functionality, or another functionality provided by a virtual desktop
208 back end system, e.g., cloud provider API
302 virtual desktop utilization software, e.g., software which upon execution performs any method first disclosed herein
304 current focus; may refer to an app within a set of apps in a virtual desktop, or to a virtual desktop within a set of virtual desktops; indicates which item will receive a user input
306 clipboard mechanism for sharing data between apps or between virtual desktops or both; computational
308 context menu mechanism; computational
310 widgets, e.g., apps that are relatively small and simple in purpose, such as widgets that show a current time or current weather conditions; computational
312 desktop switcher, e.g., a kernel or utility functionality for switching between apps; may be used for switching between virtual desktops; computational
314 interface generally in a system 102; computational
402 desktop switcher user interface; visual, computational
404 preview of window(s) that are open on a virtual desktop; visual, digital
406 tool bar; may also be called a "taskbar", "task bar", or "toolbar"; visual, computational
502 interstitial screen; visual, digital
600 data flow chart of FIG. 6; 600 also refers to methods that are illustrated by or consistent with the FIG. 6 data flow chart
602 shell; computational
604 remote client, may also be referred to as "remoting client"; computational
606 remote host, may also be referred to as "remoting host"; computational
608 remote session, may also be referred to as "remoting session" or "session"
700 data flow chart of FIG. 7; 700 also refers to methods that are illustrated by or consistent with the FIG. 7 data flow chart
800 connection between components; may be implemented using APIs or other interface mechanisms; may be unidirectional or bidirectional but presumed bidirectional unless otherwise indicated; for clarity of illustration only some of the connections in in FIG. 8 are expressly labeled but one of skill will recognize the presence of other unlabeled connections between components in FIG. 8 and FIG. 9 and between the two Figures
802 cloud desktop host; computational
804 cloud desktop availability API; computational
806 Dynamic Virtual Channel plugin; computational
808 context menu item; may refer to one or more of: displayed text in a context menu, corresponding portion of underlying data structure of the context menu, or corresponding functionality to implement an operation indicated by the displayed text
810 service provider interface; computational
812 cloud desktop provider API; computational
814 cloud desktop data model; computational 816 cloud desktop provider; computational
818 cloud desktop provider kickstart; computational
820 cloud desktop window manager; computational
822 identity token; digital
824 settings app; computational
826 availability service component; computational
828 remote computer service provider UX window component; computational
830 runtime status and health component; computational
832 remote desktop window component; computational
834 thumbnail 132 generator; computational
836 start menu manual launch component; computational
838 provisioned auto-launch component; computational
902 remoting host, also referred to as "remoting app" or "remoting host app"; computational
904 cloud desktop host API; computational
906 provisioning component; computational
908 host return UX component; computational
910 remoting app install and auto-start component; computational
912 remote host window component; computational
1000 flowchart; 1000 also refers to virtual desktop utilization methods that are illustrated by or consistent with the FIG. 10 flowchart
1002 computationally send data 118, e.g., send from one system 102 to a physically remote system 102 (local to remote, or remote to local)
1004 computationally receive data 118, e.g., receive at one system 102 from a physically remote system 102 (local from remote, or remote from local)
1006 computationally display data 118, e.g., on a monitor 126
1008 computationally obtain a user selection, e.g., via a user interface 124 of a desktop switcher 312 or via a context menu 308 user interface 124 or a clipboard 306 user interface 124 or an app user interface 124
1010 computationally set a user interface 124 focus 304
1012 computationally share a clipboard to permit data transfer, e.g., between virtual desktops
1014 computationally share data 118 about an app 122 to permit data transfer, e.g., between virtual desktops
1016 computationally display a context menu
1102 visual separator; digital
1202 icon; computational
1300 flowchart; 1300 also refers to virtual desktop utilization methods that are illustrated by or consistent with the FIG. 13 flowchart, which includes the steps of FIGS. 6-10
1302 operationally represent a virtual desktop, e.g., by displaying an icon or thumbnail which upon selection initiates giving focus 304 and thus control to the represented virtual desktop; computational
1304 reside in a cloud, e.g., as opposed to having no connection to any cloud 134 or being addressed for network communication only in one or more networks which do not meet the definition of "cloud" given in this disclosure
1306 computationally update a thumbnail 132 during a session 608
1308 computationally display a visual separator in a desktop switcher
1310 guide or monitor computational operation of a remote computer
1312 computationally specify a geographic location value 1408
1314 computationally display application thumbnails together in a virtual desktop; unless otherwise indicated, this presumably displays application thumbnails from at least two applications which are installed on respective computers that are remote from one another
1316 computationally utilize a context menu of a remote computer, e.g., by executing a selected menu item functionality
1318 computationally communicate with a service 208 or system 208
1320 computationally discover which, if any, remote computers are available to a given account
1322 computationally determine compatibility or availability or both of one or more remote computers with regard to a given account and a given local computer or a given local virtual desktop, or both
1324 computationally avoid use of a separate sessions tool, e.g., by integrating local VD access with remote VD access in a desktop switcher 312, thereby making use of a separate sessions tool unnecessary for remote virtual desktop access
1326 computationally launch a desktop switcher 312
1328 computationally select a virtual desktop, e.g., as a default or in response to user input identifying a thumbnail or icon associated with the virtual desktop
1330 computationally select a virtual desktop in response to user input which includes a click, e.g., by a mouse button, key press, touch screen tap, electronic pen tap, etc.
1332 computationally display thumbnails or icons as equals, e.g., by placing them at the same navigational depth 1402 or as leaves 1406 in a navigational path 1404 whose first branch is after entry to the desktop switcher user interface; by contrast, a remote VD thumbnail inside a window running a separate remoting sessions manager is not at the same navigational depth as a local VD thumbnail outside that window and the two VDs (local, remote) are on respective paths that diverge at the window launch point or above instead of first diverging within a desktop switcher user interface
1334 computationally notify another computer of an event impacting the remoting session, e.g., authentication success or failure, log on or log off
1336 computationally log off from an account running in a virtual desktop
1338 computationally provide a user with access to one or more virtual desktops, e.g., via a desktop switcher and other mechanisms taught herein
1340 navigational access, e.g., graphical user interface operations to access a virtual desktop, application, or other computational resource
1342 computationally communicate between virtual desktops
1344 any other step taught herein not otherwise labeled; 1344 may thus be shown expressly as a reference numeral for various steps, and may be added as a reference numeral for various steps without thereby adding new matter to the present disclosure
1402 navigational depth, e.g., the number of discrete user interface operations utilized—from a user's perspective—to access a given computational resource from a default starting condition such as the initial state of the computer after it has booted
1404 navigation path through a user interface, e.g., the path to a given computational resource specifies which menu items, icons, and so on are selected to access that computational resource
1406 leaf on a navigation path, e.g., an application, virtual desktop, etc.; additional user interface operations may be possible, so a leaf is not necessarily terminal, but rather is defined contextually based on which computational resources are of interest, e.g., due to being treated as equals or not treated as equals 1408 geographic location value; digital 1410 remote computer compatibility for remoting, as represented digitally in a system 102

1412 remote computer availability for remoting, as represented digitally in a system 102

CONCLUSION

In short, the teachings herein provide a variety of virtual desktop utilization functionalities 204 which operate in enhanced systems 202. In some embodiments, a desktop switcher 312 provides 1338 equally convenient user interface 124 navigational access 1340 to remote virtual desktops 130 as to local virtual desktops 130 for reliable and convenient human-computer interaction. Underlying mechanisms 204 transparently confirm 1320 remote computer availability 1412 and compatibility 1410 for remoting, transfer thumbnails 132 between computers 202, and support remoting sessions 608. Virtual desktops 130 may share 1012 a clipboard 306, share 1312 a geographic location setting 1408, and share 1314 application thumbnails 132, despite being based on computers 202 that are remote from one another, e.g., when only one of a session's computers 202 resides 1304 in a cloud 134. Virtual desktop 130 context menus 308 may be shown 1016 and utilized 1316 remotely. A visual separator 1102 in the desktop switcher may distinguish 1308 local virtual desktops 130 from remote virtual desktops 130. Other functionalities 204 are also described herein.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 2 and 5-10 also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A local computer which is configured to provide equal user interface navigational access to local desktops and remote desktops during human-computer interaction, the local computer comprising:
   a digital memory;
   a display;
   a desktop switcher residing in the digital memory, the desktop switcher configured for switching between virtual desktops;
   a processor in operable communication with the digital memory and the display, the processor configured to perform virtual desktop access management including: displaying a remote computer desktop thumbnail and a local computer desktop thumbnail in the desktop switcher on the local computer, the local computer desktop thumbnail operationally representing a local computer virtual desktop of the local computer, the remote computer desktop thumbnail operationally representing a remote computer virtual desktop of a remote computer which is physically remote from the local computer, each thumbnail displayed in the desktop switcher at the same navigational depth with respect to tool invocations, obtaining via the desktop switcher a user selection of the remote computer desktop thumbnail, setting a current user interface desktop focus on the local computer to be the remote computer virtual desktop, and communicating with the remote computer in response to human-computer interaction at the local computer; and
   wherein the processor is further configured to display a visual separator in the desktop switcher, the visual separator located between a local desktop thumbnail set display area and a remote desktop thumbnail set display area, the local desktop thumbnail set display area configured to display at least one local desktop thumbnail, the remote computer desktop thumbnail set display area configured to display at least one remote desktop thumbnail, the visual separator thereby visually distinguishing between local and remote desktop thumbnails.

2. The local computer of claim 1 combined in operable combination with the remote computer, and wherein the remote computer resides in a cloud.

3. The combined local computer and remote computer of claim 2, further comprising a clipboard which is configured to be shared using network communication between the remote computer virtual desktop and the local computer virtual desktop.

4. The local computer of claim 1, wherein the visual separator comprises at least one of: a vertical line segment, or a horizontal line segment.

5. A method of operation by a local computer for navigational access to local desktops and remote desktops during human-computer interaction, the method comprising:
   displaying a remote computer desktop thumbnail in a desktop switcher on the local computer, the remote computer desktop thumbnail visually representing a remote computer virtual desktop of a remote computer which is physically remote from the local computer, the remote computer desktop thumbnail being displayed together with a local computer desktop thumbnail which represents a local computer virtual desktop of the local computer, the remote computer desktop thumbnail and the local computer desktop thumbnail each displayed in the desktop switcher as a respective leaf of a human-computer interaction navigation path which branches initially at the desktop switcher;
   obtaining via the desktop switcher a user selection of the remote computer desktop thumbnail;
   setting a current user interface desktop focus on the local computer to be the remote computer virtual desktop; and
   specifying a remote computer virtual desktop geographic location value, or a remote computer geographic location value, or both, to be the same as a local computer geographic location value which matches a physical location of the local computer, and wherein the specified geographic location value does not match a physical location of the remote computer.

6. The method of claim 5, further comprising launching the desktop switcher from a widget.

7. The method of claim 5, further comprising displaying a remote computer application thumbnail and a local computer application thumbnail together in one of the computer virtual desktops.

8. The method of claim 5, further comprising displaying a context menu of the remote computer in the desktop switcher on the local computer.

9. The method of claim 5, further comprising:
the local computer communicating with a back end to discover the remote computer; and
in response to a result of the communicating, the local computer determining at least one of: a remote computer compatibility for remoting, or a remote computer availability for remoting.

10. The method of claim 5, further comprising changing the current user interface desktop focus on the local computer from the remote computer virtual desktop to the local computer virtual desktop.

11. The method of claim 5, wherein receiving the remote computer desktop thumbnail comprises communicating between a remoting client and a shell of the local computer virtual desktop.

12. The method of claim 5, further comprising at least one of the following:
launching the desktop switcher from a shell;
launching the desktop switcher in response to a keyboard input;
launching the desktop switcher in response to a mouse input; or
launching the desktop switcher in response to a touch screen input.

13. The method of claim 5, comprising displaying in the desktop switcher on the local computer: multiple remote computer desktop thumbnails representing respective remote computer virtual desktops, together with multiple local computer desktop thumbnails representing respective local computer virtual desktops.

14. The method of claim 5, wherein the displaying includes displaying the remote computer desktop thumbnail and the local computer desktop thumbnail in the desktop switcher as equals that are each selectable with a single respective click.

15. The method of claim 5, wherein the displaying includes displaying the remote computer desktop thumbnail and the local computer desktop thumbnail in the desktop switcher at the same menu depth as each other.

16. A computer-readable storage medium configured with data and instructions which upon execution by a processor cause a computing system to perform a virtual desktop utilization method, wherein a current focus computer is a computer which currently has a user interface desktop focus, and wherein the method comprises:
displaying in a desktop switcher a remote computer desktop thumbnail which represents a remote computer virtual desktop, together with a local computer desktop thumbnail which represents a local computer virtual desktop, the remote computer desktop thumbnail and the local computer desktop thumbnail each displayed at the same user interface navigation level;
communicating to the current focus computer a context menu of a virtual desktop for a computer other than the current focus computer
displaying the context menu in the desktop switcher; and
communicating a selection of a menu item of the context menu to the computer other than the current focus computer.

17. The computer-readable storage medium of claim 16, wherein the communicating communicates between a remoting client and a shell of the local computer virtual desktop.

18. The computer-readable storage medium of claim 16, wherein the communicating further communicates an application thumbnail of the application instance installed on the computer other than the current focus computer.

19. The computer-readable storage medium of claim 16, wherein the communicating further communicates a content of the clipboard which is configured to be shared using network communication between the remote computer virtual desktop and the local computer virtual desktop.

20. The computer-readable storage medium of claim 16, wherein the communicating further communicates a virtual desktop geographic location value.

* * * * *